(12) United States Patent
Pavel et al.

(10) Patent No.: US 9,084,977 B2
(45) Date of Patent: Jul. 21, 2015

(54) METHOD, SYSTEM, AND APPARATUS FOR LIFT GAS DISTRIBUTION

(75) Inventors: Stephen K. Pavel, Kingwood, TX (US);
Michael A. Silverman, Houston, TX (US); Steven A. Kalota, Irvine, CA (US)

(73) Assignee: Ivanhoe HTL Petroleum Ltd., Houston, TX (US)

( * ) Notice: Subject to any disclaimer, the term of this patent is extended or adjusted under 35 U.S.C. 154(b) by 98 days.

(21) Appl. No.: 13/340,569

(22) Filed: Dec. 29, 2011

(65) Prior Publication Data
US 2012/0167989 A1    Jul. 5, 2012

Related U.S. Application Data

(60) Provisional application No. 61/428,122, filed on Dec. 29, 2010.

(51) Int. Cl.
*F17D 3/00* (2006.01)
*B01J 8/18* (2006.01)
*B01J 8/02* (2006.01)
*B01J 8/00* (2006.01)
*B01J 8/44* (2006.01)

(52) U.S. Cl.
CPC ............... *B01J 8/1827* (2013.01); *B01J 8/002* (2013.01); *B01J 8/0278* (2013.01); *B01J 8/44* (2013.01)

(58) Field of Classification Search
CPC ............................. B01J 8/0278; B01J 8/1827
USPC ...................... 137/561 R, 599.01; 138/40, 44
See application file for complete search history.

(56) References Cited

U.S. PATENT DOCUMENTS

| | | | |
|---|---|---|---|
| 3,441,498 A * | 4/1969 | Zabielski et al. | 208/143 |
| 4,874,583 A | 10/1989 | Colvert | |
| 5,792,340 A | 8/1998 | Freel et al. | |
| 5,958,220 A * | 9/1999 | Reynolds et al. | 208/108 |
| 5,961,786 A | 10/1999 | Freel et al. | |
| 7,270,743 B2 | 9/2007 | Freel et al. | |
| 7,572,362 B2 | 8/2009 | Freel et al. | |

(Continued)

FOREIGN PATENT DOCUMENTS

| | | |
|---|---|---|
| CA | 2823332 | 8/2014 |
| CN | 1214007 A | 4/1999 |

(Continued)

OTHER PUBLICATIONS

U.S. Appl. No. 13/340,487.

(Continued)

*Primary Examiner* — John K Fristoe, Jr.
*Assistant Examiner* — Reinaldo Sanchez-Medina
(74) *Attorney, Agent, or Firm* — Orrick, Herrington & Sutcliffe, LLP

(57) ABSTRACT

A method, system, and apparatus for lift gas distribution are disclosed. According to one embodiment, a lift gas distributor comprises a plate having a surface and an underside, the plate having a first diameter; a center section of the plate having a second diameter, wherein the first diameter is larger than the second diameter; a predetermined number of holes having a third diameter drilled into the surface of the plate, the holes drilled at an angle, the holes evenly distributed in the center section; and a plurality of tubes welded onto the underside of the plate, each tube having a predetermined length, wherein each tube is welded onto each hole. Lift gas passes through the tubes and holes into a reactor.

20 Claims, 13 Drawing Sheets

(56) References Cited

U.S. PATENT DOCUMENTS

| | | |
|---|---|---|
| 7,572,365 B2 | 8/2009 | Freel et al. |
| 7,905,990 B2 | 3/2011 | Freel et al. |
| 7,943,014 B2* | 5/2011 | Berruti et al. ............... 202/108 |
| 8,105,482 B1 | 1/2012 | Freel et al. |
| 2008/0197012 A1* | 8/2008 | Berruti et al. ............... 201/31 |
| 2008/0230440 A1 | 9/2008 | Graham |
| 2010/0015018 A1* | 1/2010 | Augier et al. ............... 422/220 |
| 2012/0138175 A1* | 6/2012 | Xu et al. ............... 137/599.01 |

FOREIGN PATENT DOCUMENTS

| | | |
|---|---|---|
| CN | 201180068760.0 | 11/2014 |
| CO | 13-155-524 | 6/2014 |
| DE | 43 05 001 A1 | 8/1994 |
| JP | H06-508159 | 9/1994 |
| JP | 2009-520584 A | 7/2007 |
| JP | 2010-168331 A | 5/2010 |
| JP | 2013-547681 | 9/2014 |
| WO | WO 00/61705 A1 | 10/2000 |

OTHER PUBLICATIONS

U.S. Appl. No. 13/341,854.
International Search Report; International Application No. PCT/US2001/067985.

* cited by examiner

METHOD, SYSTEM, AND APPARATUS FOR LIFT GAS DISTRIBUTION

The present application claims the benefit of and priority to U.S. Provisional Application Ser. No. 61/428,122, titled "LIFT GAS DISTRIBUTOR FOR IMPROVED PRODUCT DISTILLATE API," filed on Dec. 29, 2010, which is hereby incorporated by reference herein in its entirety for all purposes.

FIELD

The present invention generally relates to rapid thermal processing of viscous oil feedstock. More specifically, the present invention is directed to an improved lift gas distributor assembly for distributing lift gas in the rapid thermal processing for upgrading viscous heavy feedstocks.

BACKGROUND

Heavy oil and bitumen resources are supplementing the decline in the production of conventional light and medium crude oils, and production from these resources is steadily increasing. Pipelines cannot handle the crude oils unless diluents are added to decrease their viscosity and specific gravity to pipeline specifications. Alternatively, desirable properties are achieved by primary upgrading. However, diluted crudes or upgraded synthetic crudes are significantly different from conventional crude oils. As a result, bitumen blends or synthetic crudes are not easily processed in conventional fluid catalytic cracking refineries. Therefore, in either case further processing must be done in refineries configured to handle either diluted or upgraded feedstocks.

Many heavy hydrocarbon feedstocks are also characterized as comprising significant amounts of BS&W (bottom sediment and water). Such feedstocks are not suitable for transportation by pipeline, or refining due to their corrosive properties and the presence of sand and water. Typically, feedstocks characterized as having less than 0.5 wt. % BS&W are transportable by pipeline, and those comprising greater amounts of BS&W require some degree of processing or treatment to reduce the BS&W content prior to transport. Such processing may include storage to let the water and particulates settle, and heat treatment to drive off water and other components. However, these manipulations add to operating cost. There is therefore a need within the art for an efficient method of upgrading feedstock having a significant BS&W content prior to transport or further processing of the feedstock.

The use of fluid catalytic cracking (FCC), or other units for the direct processing of bitumen feedstocks is known in the art. However, many compounds present within the crude feedstocks interfere with these processes by depositing on the contact material itself. These feedstock contaminants include metals such as vanadium and nickel, coke precursors such as (Conradson) carbon residues, and asphaltenes. Unless removed by combustion in a regenerator, deposits of these materials can result in poisoning and the need for premature replacement of the contact material. This is especially true for contact material employed with FCC processes, as efficient cracking and proper temperature control of the process requires contact materials comprising little or no combustible deposit materials or metals that interfere with the catalytic process.

SUMMARY

A method, system, and apparatus for lift gas distribution are disclosed. According to one embodiment, a lift gas distributor comprises a plate having a surface and an underside, the plate having a first diameter; a center section of the plate having a second diameter, wherein the first diameter is larger than the second diameter; a predetermined number of holes having a third diameter drilled into the surface of the plate, the holes drilled at an angle, the holes evenly distributed in the center section; and a plurality of tubes welded onto the underside of the plate, each tube having a predetermined length, wherein each tube is welded onto each hole. Lift gas passes through the tubes and holes into a reactor.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION

The accompanying drawings, which are included as part of the present specification, illustrate the presently preferred embodiment and, together with the general description given above and the detailed description of the preferred embodiment given below, serve to explain and teach the principles of the present invention.

Figure 1:
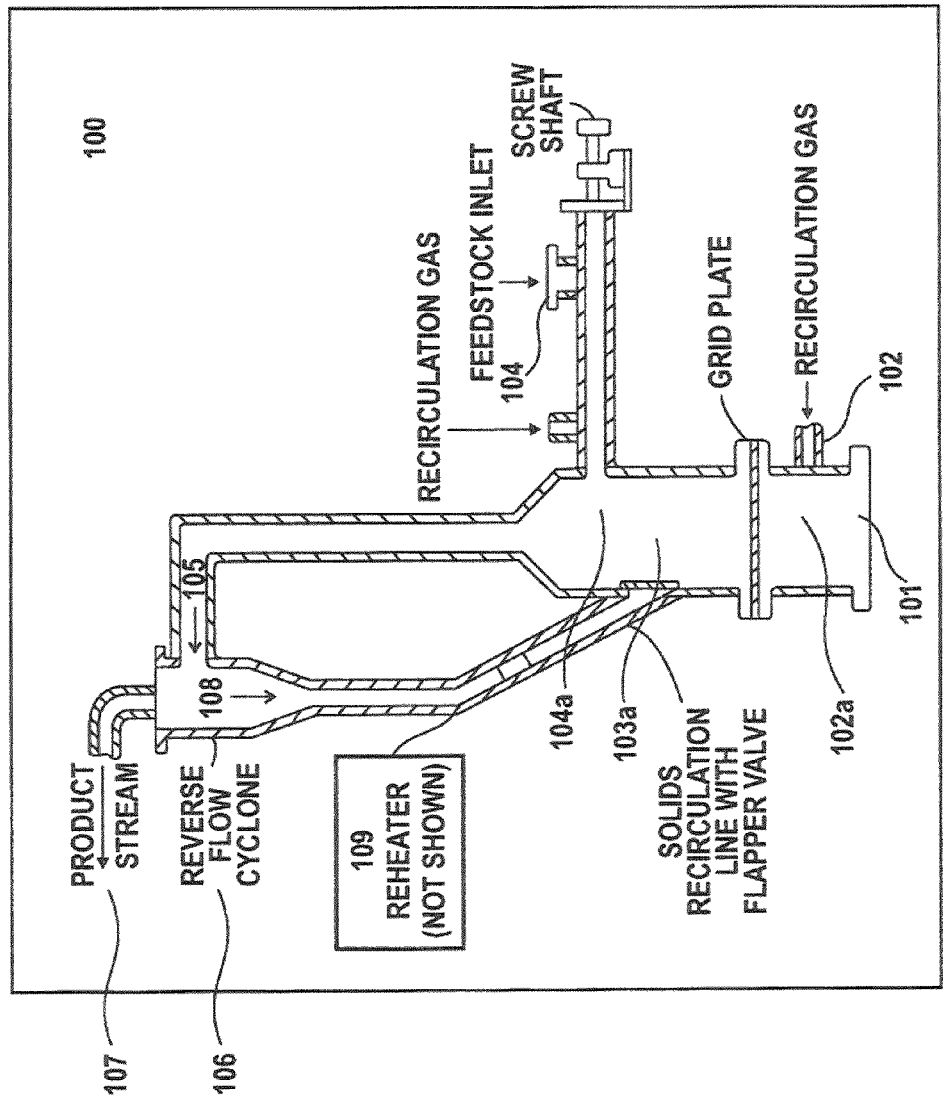
FIG. 1 illustrates a prior art reactor design.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

A method, system, and apparatus for lift gas distribution are disclosed. According to one embodiment, a lift gas distributor comprises a plate having a surface and an underside, the plate having a first diameter; a center section of the plate having a second diameter, wherein the first diameter is larger than the second diameter; a predetermined number of holes having a third diameter drilled into the surface of the plate, the holes drilled at an angle, the holes evenly distributed in the center section; and a plurality of tubes welded onto the underside of the plate, each tube having a predetermined length, wherein each tube is welded onto each hole. Lift gas passes through the tubes and holes into a reactor.

The present disclosure provides an apparatus or distributor assembly that is capable of propelling and distributing lift gas into a reactor without the deficiencies associated with the prior art methods and apparatuses, and a method for using the same. The purpose of the reactor is to convert a heavy oil feedstock into a lighter end product, via pyrolysis reaction (thermal cracking) inside a circulating bed, solid heat carrier transport reactor system. These processes also reduce the levels of contaminants within feedstocks, thereby mitigating contamination of catalytic contact materials such as those used in cracking or hydrocracking, with components present in the heavy oil or bitumen feedstock. Such processes and/or methods and the related apparatuses and products are described in U.S. Pat. No. 7,572,365; U.S. Pat. No. 7,572,362; U.S. Pat. No. 7,270,743; U.S. Pat. No. 5,792,340; U.S. Pat. No. 5,961,786; U.S. Pat. No. 7,905,990; and pending U.S. patent application Ser. Nos. 13/341,854, 13/340,487, 12/046,363 and 09/958,261 incorporated herein by reference in their entirety.

As described in U.S. Pat. No. 5,792,340 (incorporated herein by reference in its entirety), for the present type of pyrolysis reactor system, a feed dispersion system is required for liquid feedstock. Transport gas (lift gas) is introduced to the reactor through a plenum chamber located below a gas distribution plate. The purpose of the feed dispersion system is to achieve a more efficient heat transfer condition for the liquid feedstock by reducing the droplet size of the liquid feed to increase the surface area to volume ratio. The purpose of the lift gas distribution plate (distributor plate) is to provide the optimum flow regime of gas that facilitates the mixing of feed and solid heat carrier.

By "feedstock" or "heavy hydrocarbon feedstock", it is generally meant a petroleum-derived oil of high density and viscosity often referred to (but not limited to) heavy crude, heavy oil, (oil sand) bitumen or a refinery resid (oil or asphalt). However, the term "feedstock" may also include the bottom fractions of petroleum crude oils, such as atmospheric tower bottoms or vacuum tower bottoms. Furthermore, the feedstock may comprise significant amounts of BS&W (Bottom Sediment and Water), for example, but not limited to, a BS&W content of greater than 0.5 wt %. Heavy oil and bitumen are preferred feedstocks. Embodiments of the invention can also be applied to the conversion of other feedstocks including, but not limited to, plastics, polymers, hydrocarbons, petroleum, coal, shale, refinery feedstocks, bitumens, light oils, tar mats, pulverized coal, biomass, biomass slurries, biomass liquids from any organic material and mix. Preferably, the biomass feedstock is a dry wood feedstock, which may be in the form of sawdust, but liquid and vapor-phase (gas-phase) biomass materials can be effectively processed in the rapid thermal conversion system using an alternative liquid or vapor-phase feed system. Biomass feedstock materials that may be used include, but are not limited to, hardwood, softwood, bark, agricultural and silvicultural residues, and other biomass carbonaceous feedstocks.

FIG. 1 illustrates a prior art reactor design. The reactor design 100 includes a tubular reactor 101 where recirculation or lift gas 102 enters at a lowest point 102a. Regenerated solid heat carrier 103 enters at a slightly higher point 103a, and reactor feed liquid 104 is introduced at a highest point 104a. Coked/spent solid heat carrier, products, and other gases and particulates 105 emanated from the top of the reactor enter a cyclone separator 106, where the gases (product vapor and other gases) and solids (solid heat carrier and particulates) separate. The product vapor and other gases continue on downstream of the process for further separation of products 107. The stream of solids 108 enters a reheater system 109 (reheater system 109 not depicted in figure but inclusion in system will be appreciated by one of ordinary skill in the art). The solid heat carrier gets regenerated, and then passes through a lateral section to transport the regenerated solid heat carrier 103 back to the reactor 101.

Figure 2:
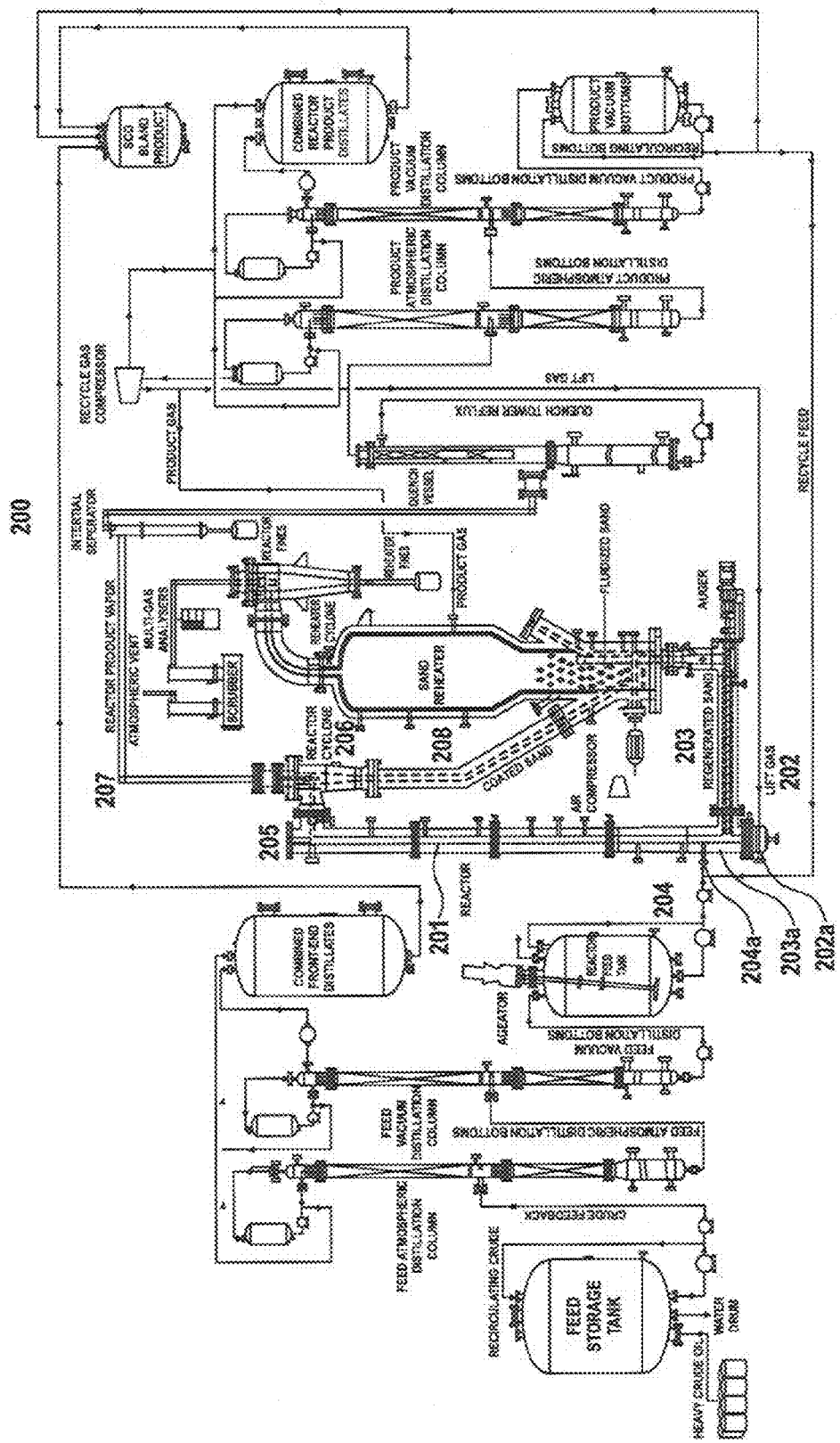
FIG. 2 illustrates an exemplary reactor design for use with the present system, according to one embodiment.

FIG. 2 illustrates an exemplary reactor design for use with the present system, according to one embodiment. Similar to the prior art reactor 100 depicted in FIG. 1, reactor 200 design includes a tubular reactor 201 where recirculation or lift gas 202 enters at a lowest point 202a. Regenerated solid heat carrier 203 enters the reactor 200 at a slightly higher point 203a. Reactor feed liquid 204 is introduced at a highest point 204a in relation to the entry points of the lift gas (202a) and solid heat carriers (203a). Coked/spent solid heat carrier, products, and other gases and particulates 205 emanated from the top of the reactor enter a cyclone separator 206, where the gases (product vapor and other gases) and solids (solid heat carrier and particulates) separate. The product vapor and other gases continue on downstream of the process for further separation of products 207. The solids re-enter the reactor system 208, the solid heat carrier gets regenerated, and then a lateral section transports the regenerated solid heat carrier 203 back to the reactor. It will be appreciated by one of ordinary skill in the art that the specific methods for solid heat carrier regeneration and transport back to the reactor may have variations between embodiments without departing from the scope of the present disclosure.

Performance of the prior art reactor design 100 depicted in FIG. 1 can be evaluated by properties that indicate the effectiveness of a particular equipment configuration. The properties illustrate the distribution of feed material into both desirable and less desirable products, as well as physical properties of the final product. The desirable resulting products include any hydrocarbon liquid that remains from the thermal cracking process, because the liquid can be recovered to be blended into the final product, or perhaps get reprocessed. Meanwhile, the coke and gas produced from the process are used to generate steam for oil recovery, or electricity, depending on location and are valued at natural gas price.

A setup using the prior art design 100 that processed Athabasca Bitumen feedstock included the reactor temperature set at 525° C. (typical operating temperature), Athabasca Bitumen whole crude Vanadium content: 209 ppm, Athabasca Bitumen Run product Vanadium content: 88 ppm, Athabasca Bitumen whole crude Nickel content: 86 ppm, and Athabasca Bitumen Run product Nickel content: 24 ppm. Table 1 summarizes the properties obtained.

TABLE 1

Properties of prior art reactor design Athabasca Bitumen run at 525° C.

| API | Liquid Yield (wt %) | Viscosity at 40° C. (cSt) | Vanadium Removal (wt %) | Nickel Removal (wt %) |
|---|---|---|---|---|
| 12.9 | 74.4 | 201 | 68.7 | 79.2 |

The properties shown in Table 1 serve as a baseline for design comparisons throughout the present disclosure, with emphasis on the lift gas distributor plate.

FIG. 3A illustrates an exemplary reactor configuration for use with the present system, according to one embodiment. The reactor 301 is a vertical tubular vessel having a top end 301b and a bottom end 301a. Recycled product gas (lift gas) 302 designed to enter the reactor at a lowest point 302a from the very bottom 301a. Regenerated solid heat carrier 303 enters the reactor 301 at a slightly higher position 303a, and finally heavy oil feed 304 enters the reactor 301 at a point 304a above the solid heat carrier entrance 303a.

The lift gas first exits the piping into the windbox 305, a short cylindrical structure with a bottom bowl built directly underneath the tubular reactor 301. According to one embodiment, the windbox cylinder 305 spans a diameter of 14 inches, and is connected via flanges 307 and 308 to the bottom 301a of the tubular reactor 301, which is 4 inches in diameter. A distributor plate 306 is located between the reactor bottom 301a and the windbox 305, and is held together by the flanges 307 and 308. As the lift gas 302 exits the windbox 305, it passes through the distributor plate 306, and into the 4" diameter reactor 301. Ultimately, the purpose of the distributor plate 306 is to modify the flow characteristics of the lift gas 302 entering the reactor 301, through different configurations of holes in the distributor plate 301.

Figure 3:
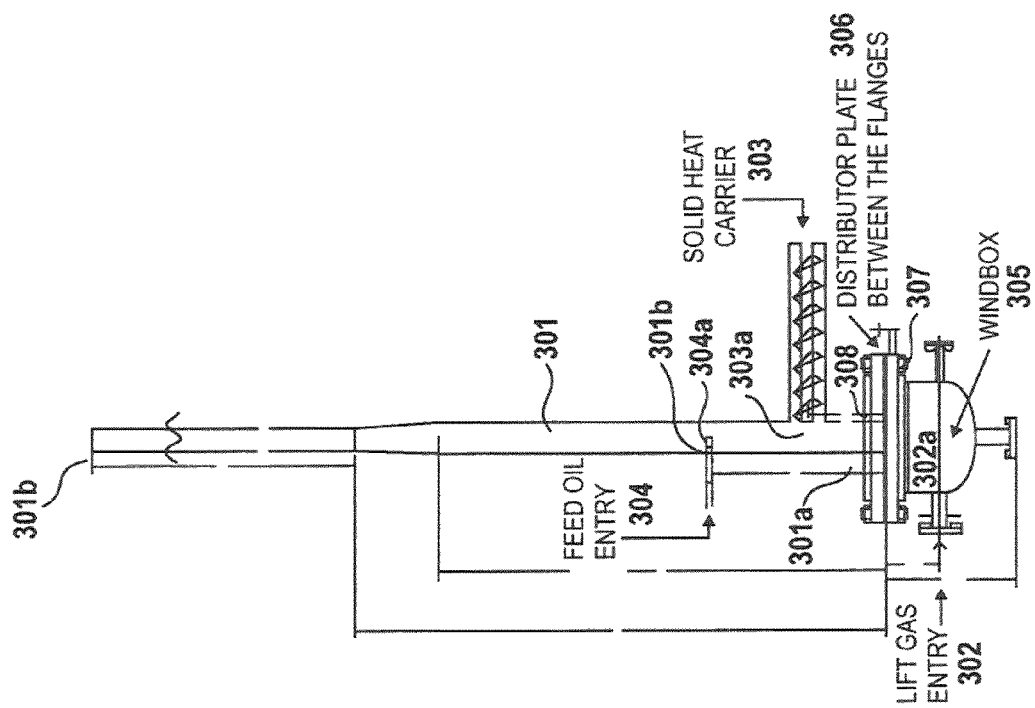
FIG. 3A illustrates an exemplary reactor configuration for use with the present system, according to one embodiment.
FIG. 3B illustrates an exemplary distributor plate hole configuration for use with the present system, according to one embodiment.
Figure 3B:
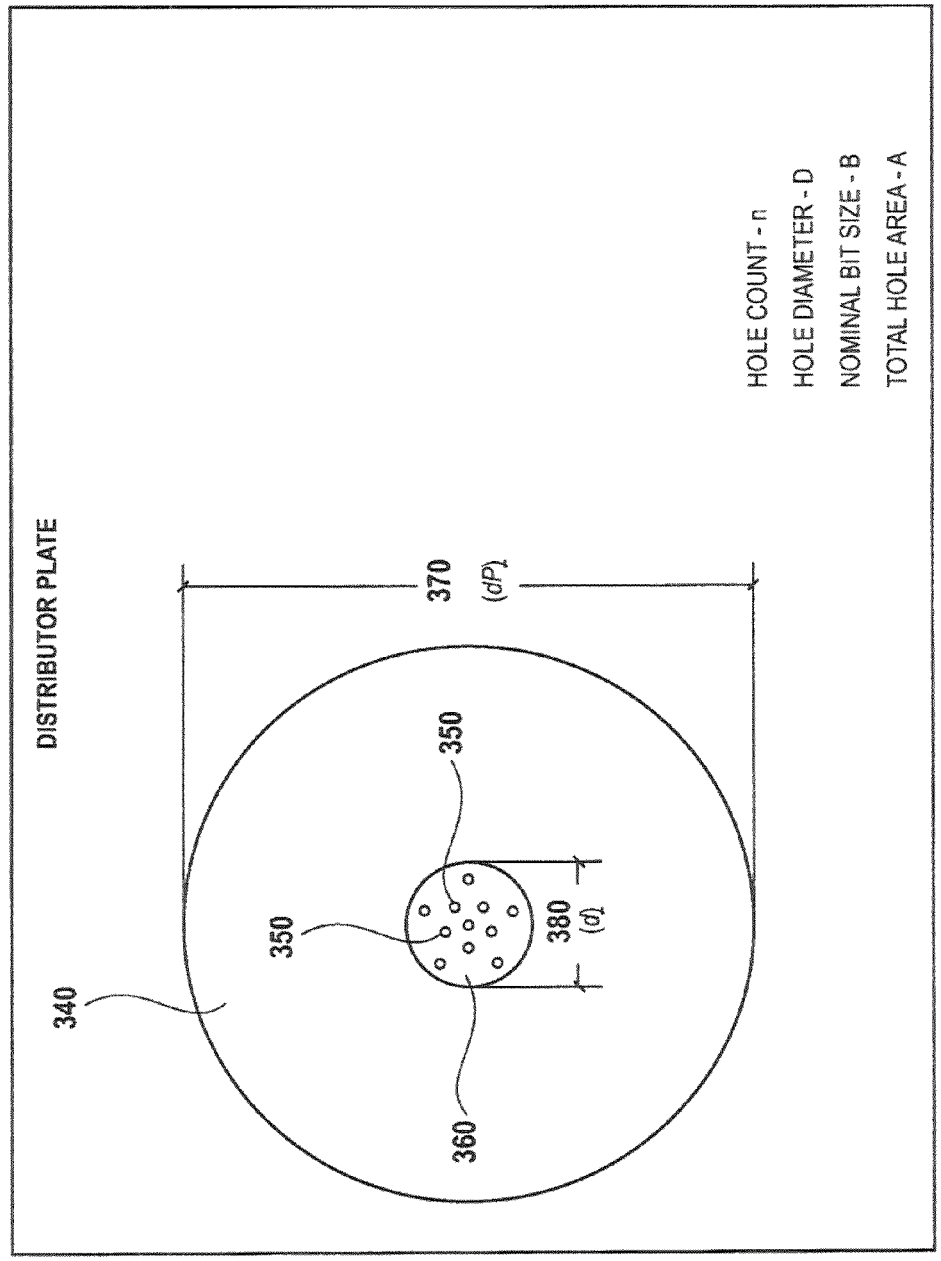

FIG. 3B illustrates an exemplary distributor plate hole configuration for use with the present system, according to one embodiment. A distributor plate 340 has a diameter 370 of dP, with a center section 360 having a diameter 380 of d. The center section 360 includes a count of n holes 350, and each hole 350 has a hole diameter of D. The center section 360 is fabricated using a nominal bit size of B, and has a total hole area of A. The distributor plate 340 is designed in accordance with specifications of the reactor configuration, therefore the plate 340 is circular and has a diameter dP larger than a diameter of the windbox (yet small enough to fit within the flange bolts). The holes 350 in the center area 360 of the plate conform to a boundary set by the diameter of the reactor (e.g. a 4 inch diameter).

Figure 4:
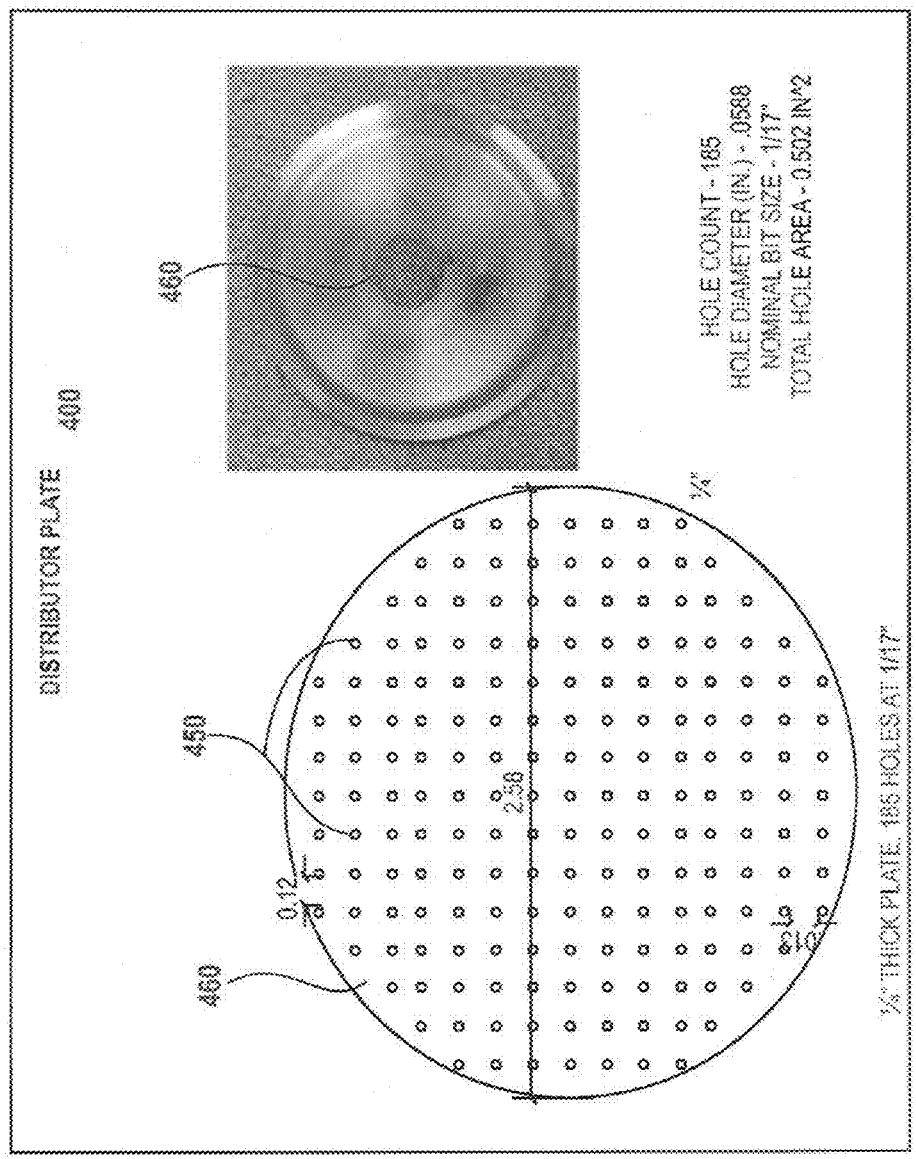
FIG. 4 illustrates a prior art distributor plate.

FIG. 4 illustrates a prior art distributor plate. Distributor plate 400 is a circular stainless steel plate having a thickness of ¼ inch and a diameter dP of 18 inches. Distributor plate 400 is fabricated based on a distributor plate template depicted in FIG. 3B. A center section 460 of distributor plate 400 has a count of 185 holes (450) with a uniform diameter D of $1/17$ inches. Each hole 450 is drilled perpendicular (90° angle) to the plate surface, and is laid out in a grid pattern that resembles a regular octagon. All 185 holes (450), having a total hole area A of 0.502 in$^2$, are concentrated within a unit circle having a diameter d of 2.58 inches, which is well within a 4 inch diameter boundary of the reactor, according to one embodiment.

With the high number of small holes in a grid style layout, the distributor design 400 creates a uniform, dispersed gas flow with moderate mass flow rate and velocity through each hole 450. The distributor design 400 does not direct the lift gas up the reactor; as the lift gas exits the many holes of the distributor there is no directional momentum, as the lift gas slows and distributes in every direction as it exits the distributor.

One method of evaluating the performance of a reactor distributor plate is to determine the superficial velocity of the lift gas stream leaving the distributor plate holes. The superficial velocity is dependent on the volumetric flow of lift gas into the reactor, the size of the distributor plate holes, as well as the total number of holes.

Based on specifications detailed in FIG. 4, the cross-sectional area of one hole 450 in the distributor 400 is calculated as follows:

$$D = \text{hole diameter} = (1/17 \text{ in.}) \times (1 \text{ ft}/12 \text{ in.}) = 0.0049 \text{ ft}$$

$$C_A = \text{cross-sectional area of one hole}$$
$$= \pi \times (D/2)^2$$
$$= \pi \times (0.0049 \text{ ft})^2 \div 4$$
$$= 0.0000189 \text{ ft}^2.$$

Knowing the lift gas volumetric flow rate, the superficial velocity of lift gas exiting through one of the 185 holes 450 is calculated as follows:

$$F = 28 \text{ ft}^3/\text{min}$$
$$D = \text{hole diameter} = 0.0049 \text{ ft}$$
$$n = \text{number of holes} = 185$$
$$V_S = \text{superficial velocity of lift gas out of one hole}$$
$$= F \div (n \times D)$$
$$= (28 \text{ ft}^3/\text{min}) \div (185 \times 0.0000189 \text{ ft}^2) \div (60 \text{ s/min})$$
$$= 133 \text{ ft/s}.$$

Therefore, an exemplary superficial velocity of lift gas discharged from one hole of the distributor 400 is 133 ft/s. The significance of the lift gas velocity through one hole is the lasting effect of the gas stream from the one hole. For a gas stream with a low initial velocity, the momentum of the gas stream would dissipate quicker than a gas stream with a higher initial velocity. The momentum loss equates to the decrease of usefulness of the lift gas to carry the fluidized solid heat carrier.

Another method for evaluating the performance of a reactor distributor plate is to evaluate its ability to provide proper lift gas distribution to the reactor that best facilitate the mixing of reactor feed and fluidized solid heat carrier. As shown in FIG. 3, the lift gas 302 is released into the reactor at a lowest point 302a, followed by the solid heat carrier 303 at a higher point 303a, and finally the reactor feed 304 at the highest point 304a. The role of the lift gas is to facilitate the movement of the fluidized solid heat carrier upwards toward the release point of reactor feed, as the hot solid heat carrier enters the reactor from the auger exit.

The lift gas influences the flow of fluidized solid heat carrier in two ways. First, the flow of lift gas from the bottom of the reactor creates a high pressure zone at the bottom of the reactor, in relation to the top of the reactor. By virtue of pressure difference, the flow of fluidized solid heat carrier up the reactor is favored. Second, the flow path of lift gas, dependant on the design of the distributor plate, crosses the entry point of solid heat carrier and physically directs the fluidized solid heat carrier within its flow path towards the reactor feed entry point. To visualize the flow path of the lift gas, computational fluid dynamics (CFD) software is used.

Figure 5:
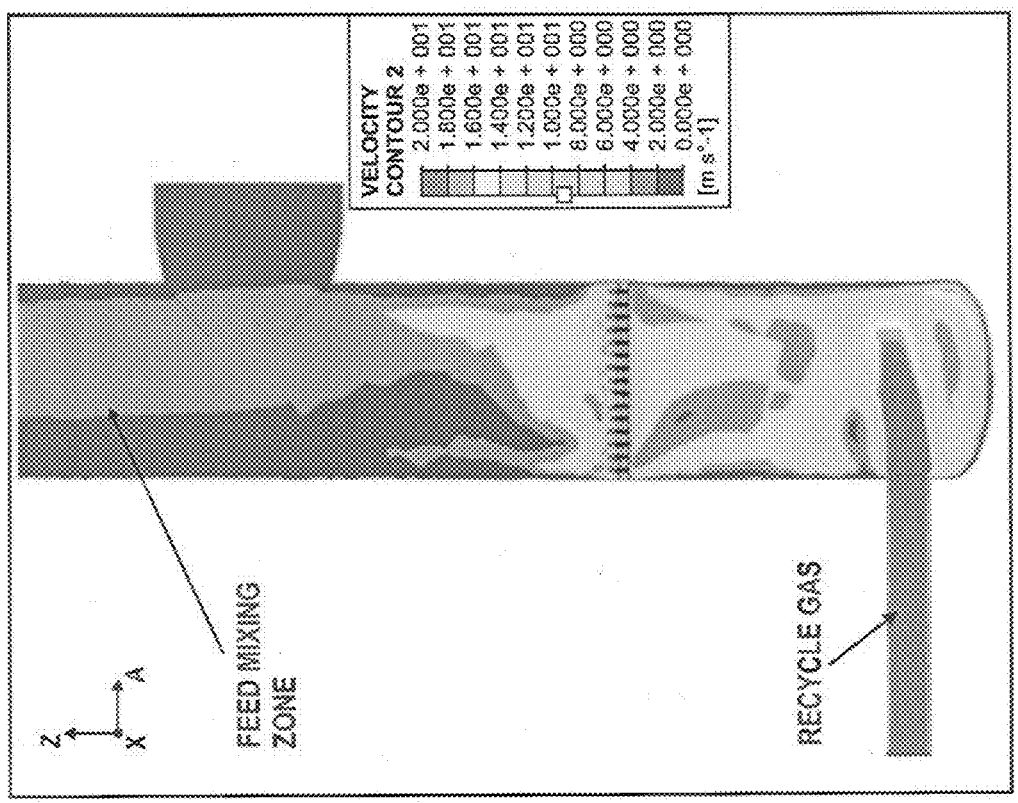
FIG. 5 illustrates an exemplary CFD visualization of lift gas flow velocities in a reactor having a distributor plate according to FIG. 4, according to one embodiment.

FIG. 5 illustrates an exemplary CFD visualization of lift gas flow velocities in a reactor having a distributor plate according to FIG. 4, according to one embodiment. Based on the legend, the lighter grays indicate a higher velocity zone for the lift gas in the reactor. As shown in FIG. 5, a uniform velocity results between 4 and 10 m/s near the bottom of the reactor when a distributor plate 400 according to FIG. 4 is used, and the flow path continues upward beyond the feed entry point between 2 and 4 m/s. Therefore, from the entry point of the solid heat carrier through the entry point of the reactor feed, there is a net upward flow of lift gas that brings the solid heat carrier upwards towards the reactor feed entry (feed mixing zone).

Figure 6:
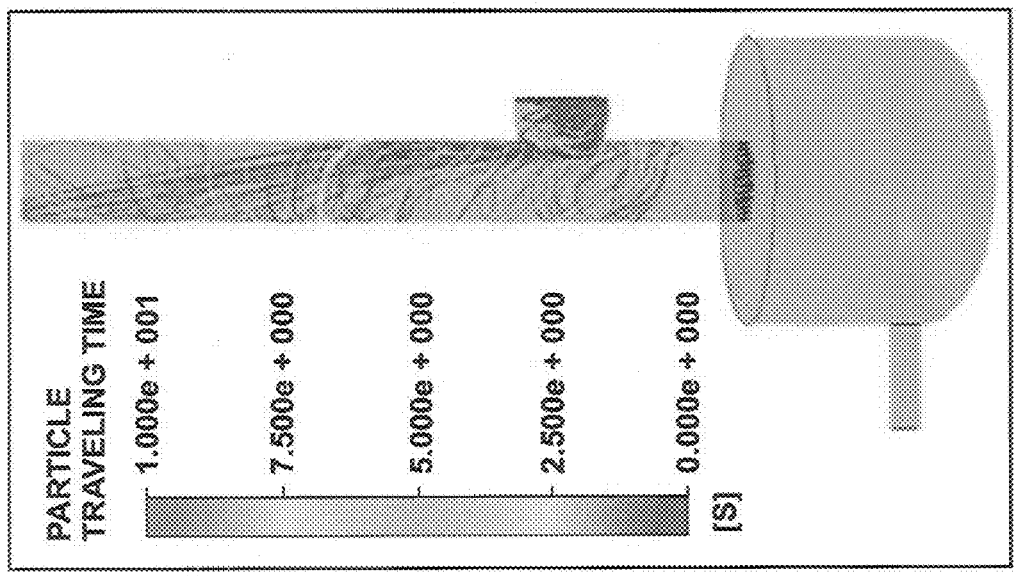
FIG. 6 illustrates particle movement in an exemplary reactor design having a distributor plate according to FIG. 4, according to one embodiment.

CFD software also enables visualization of the flow of solid heat carrier particles, based on the lift gas flow regimes created by the distributor plate 400. FIG. 6 illustrates particle movement in an exemplary reactor design having a distributor plate according to FIG. 4, according to one embodiment. The movement of particles is tracked in the first 10 seconds after the particles entered the reactor, based on standard reactor conditions and the flow of lift gas. Based on the legend, the lighter the gray, the longer the particle was captured in the diagram. A large portion of the particles tracked traveled straight up the reactor as soon as they entered the reactor. The rest of the particles continue to swirl around the lower portion of the reactor. With the distributor plate 400 according to FIG. 4, a bulk of the solid heat carrier travels in a relatively straight path upwards, through the reactor feed entry, and towards the top of the reactor in a short residence time. Hardly any particles reach the bottom of the reactor, due to the uniform and wide coverage of the reactor bottom by the distributor 400 holes 450.

Based on the CFD visualization, the distributor plate 400 is able to create a lift gas flow regime that assists the flow of fluidized solid heat carrier into the reactor feed mixing zone. In practice, it is known that a multitude of small holes leads to small bubbles created by the lift gas in the solid heat carrier to coalesce making larger bubbles, causing voids rather than plug flow regimes for efficient feed contact.

Figure 7:
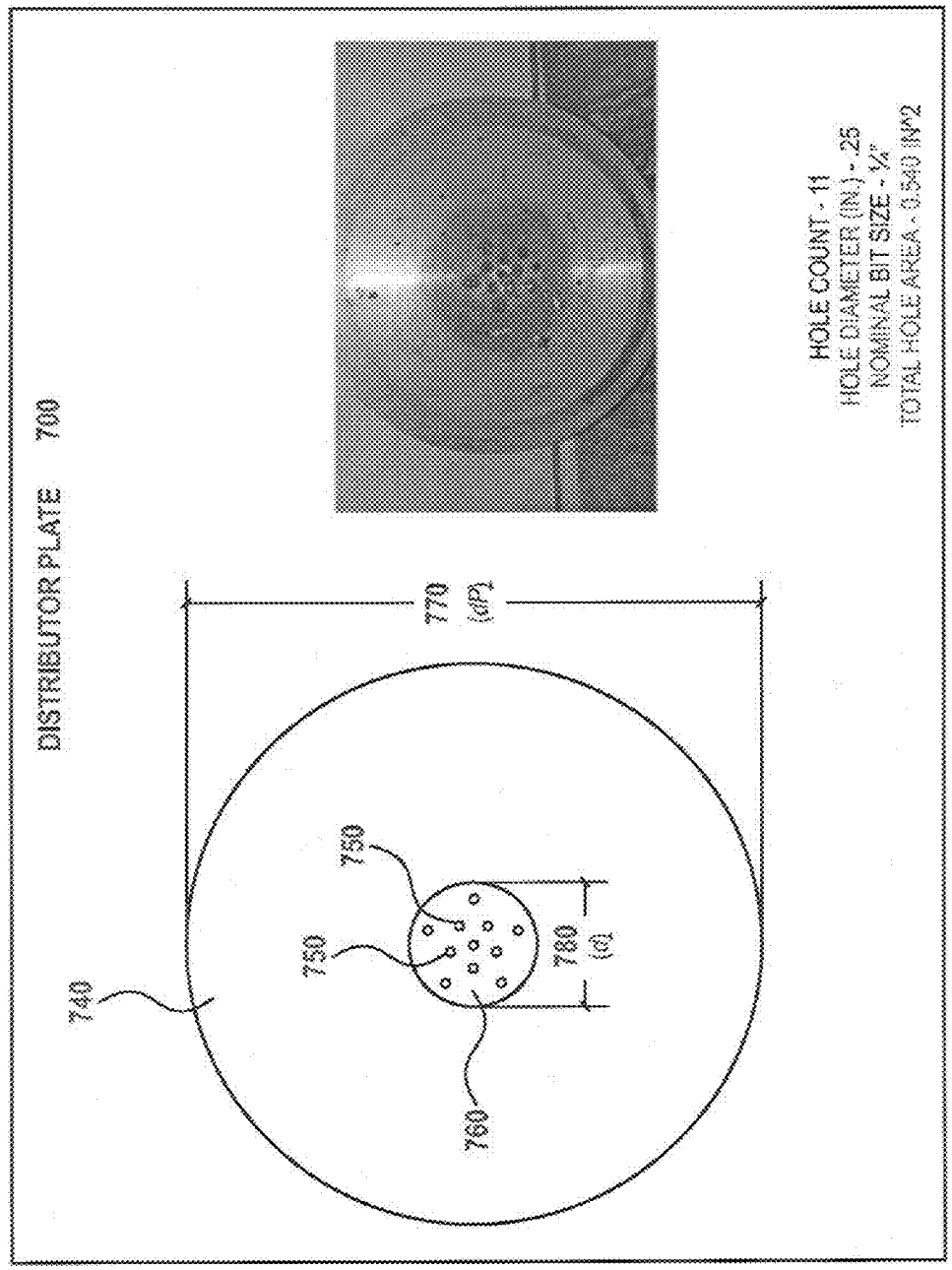
FIG. 7 illustrates an exemplary embodiment of an improved distributor plate for use with the present system.

FIG. 7 illustrates an exemplary embodiment of an improved distributor plate 700 for use with the present system. Within an exemplary 4 inch diameter (d, 780) boundary, the distributor 700 contains 11 (n) holes 750 laid out in a five-pointed star pattern at a center section 760 of the plate 740. Each hole 750 is drilled perpendicular (90° angle) to the plate surface 760, with a uniform size of ¼ inch diameter (D) for each hole 750. With the fewer number of large holes, the distributor plate 700 intends to create gas streams at the reactor bottom with both higher velocity and wider flow path.

Based on specifications detailed in FIG. 7, the cross-sectional area of one hole 750 of the distributor plate 700 can calculated as follows:

$$D = \text{hole diameter} = (1/4 \text{ in.}) \times (1 \text{ ft}/12 \text{ in.}) = 0.0208 \text{ ft}$$

$$C_A = \text{cross-sectional area of one hole}$$
$$= \pi \times (D/2)^2$$
$$= \pi \times (0.0208 \text{ ft})^2 \div 4$$
$$= 0.000340 \text{ ft}^2.$$

Knowing the lift gas volumetric flow rate, the superficial velocity of lift gas exiting through one of the 11 holes 750 can be calculated as follows:

$$F = 28 \text{ ft}^3/\text{min}$$

$$D = \text{hole diameter} = 0.0208 \text{ ft}$$

$$n = \text{number of holes} = 11$$

$$V_S = \text{superficial velocity of lift gas out of one hole}$$
$$= F \div (n \times D)$$
$$= (28 \text{ ft}^3/\text{min}) \div (11 \times 0.000340 \text{ ft}^2) \div (60 \text{ s/min})$$
$$= 125 \text{ ft/s}.$$

Therefore, an exemplary superficial velocity of lift gas discharged from one hole 750 of the distributor 700 is 125 ft/s.

Figure 8:
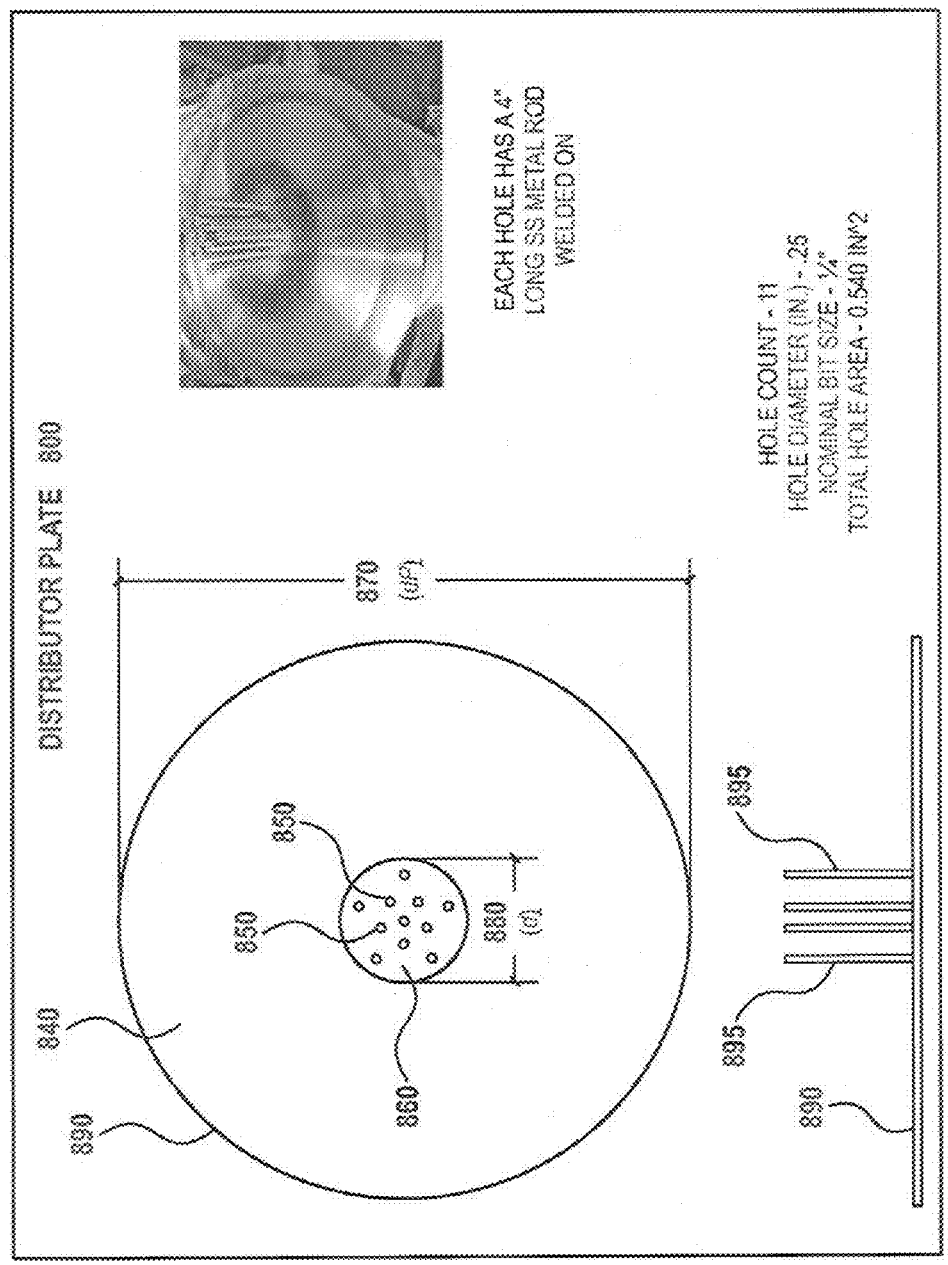
FIG. 8 illustrates a further exemplary embodiment of an improved distributor plate for use with the present system.

FIG. 8 illustrates a further exemplary embodiment of an improved distributor plate 800 for use with the present system. Within an exemplary 4 inch diameter boundary (d, 880), the distributor 800 contains 11 (n) holes 850 laid out in a five-pointed star pattern at a center section 860 of the plate 840. Each hole 850 was drilled perpendicular (90° angle) to the plate surface 860, with a uniform size of ¼ inch diameter (D) for each hole 850. At an underside 890 (facing down into the windbox) of the distributor 800, stainless steel metal rods (tubes) 895 having a length L each of 4 inches are welded onto each of the 11 holes 850. The tubes 895 have a hollow passage for allowing the lift gas to travel through them. Thus, the distance that the lift gas must travel between the windbox exit and the reactor entrance is 4 inches (L) through the tubes 895, and ¼ inches through the thickness of the distributor plate 800.

With the fewer number (n=11) of large holes 850, the distributor plate 800 creates gas streams at the reactor bottom with both higher velocity and wider flow path. The tubes 895 at the bottom 890 of the distributor plate 800 straighten the gas stream entering the reactor, and help avoid the dispersion effect of a high velocity fluid passing through a small orifice. With these implementations, the distributor 800 creates lift gas streams that are faster, bigger, and less dispersed.

Based on specifications detailed in FIG. 8, the cross-sectional area of one hole 850 of the distributor 800 can be calculated as follows:

$$D = \text{hole diameter} = (1/4 \text{ in.}) \times (1 \text{ ft}/12 \text{ in.}) = 0.0208 \text{ ft}$$

$$C_A = \text{cross-sectional area of one hole}$$
$$= \pi \times (D/2)^2$$
$$= \pi \times (0.0208 \text{ ft})^2 \div 4$$
$$= 0.000340 \text{ ft}^2.$$

Knowing the lift gas volumetric flow rate, the superficial velocity of lift gas exiting through one of the 11 holes 850 can be calculated as follows:

$$F = 28 \text{ ft}^3/\text{min}$$

$$D = \text{hole diameter} = 0.0208 \text{ ft}$$

$$n = \text{number of holes} = 11$$

$$V_S = \text{superficial velocity of lift gas out of one hole}$$
$$= F \div (n \times D)$$
$$= (28 \text{ ft}^3/\text{min}) \div (11 \times 0.000340 \text{ ft}^2) \div (60 \text{ s/min})$$
$$= 125 \text{ ft/s}.$$

Therefore, an exemplary superficial velocity of lift gas discharged from one hole 850 of the distributor 800 is 125 ft/s.

Figure 9:
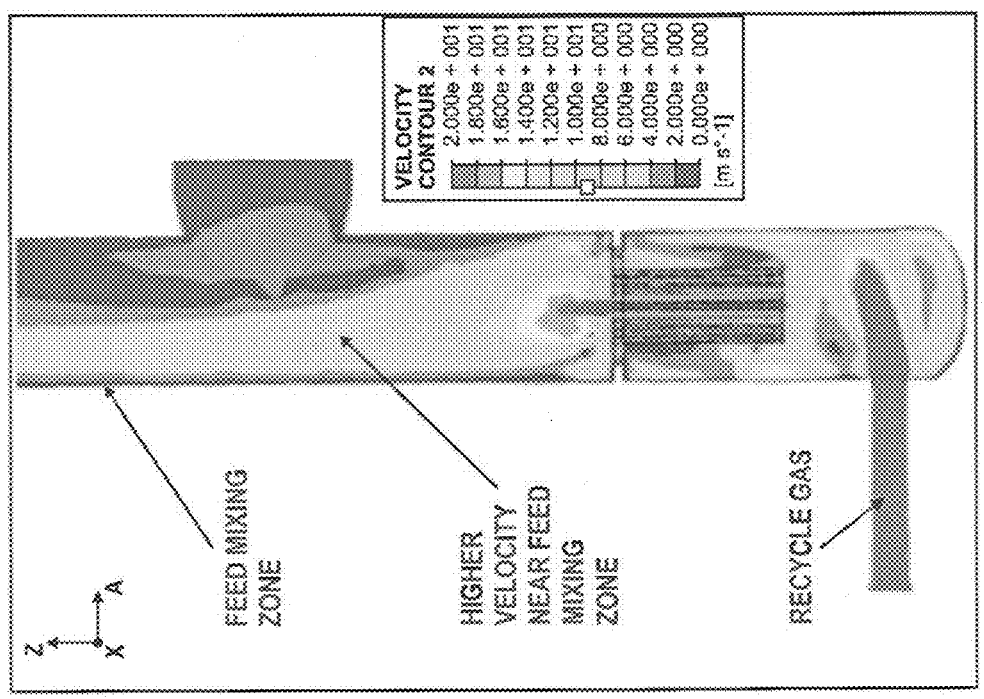
FIG. 9 illustrates an exemplary CFD visualization of lift gas flow velocities in a reactor having a distributor plate according to FIG. 8, according to one embodiment.

FIG. 9 illustrates an exemplary CFD visualization of lift gas flow velocities in a reactor having a distributor plate according to FIG. 8, according to one embodiment. Based on the legend, the lighter grays indicate a higher velocity zone for the lift gas in the reactor. As shown in FIG. 9, the lift gas stream produced by a distributor plate 800 according to FIG. 8 sustains a high velocity from the moment of discharge at the distributor plate to the feed mixing zone. At the same time, the upward-flowing lift gas stream is more concentrated. In theory, distributor 800 is able to impart more upward movement of fluidized solid heat carrier in the high velocity region, and induce a more turbulent and less linear flow regime outside the high velocity region.

Figure 10:
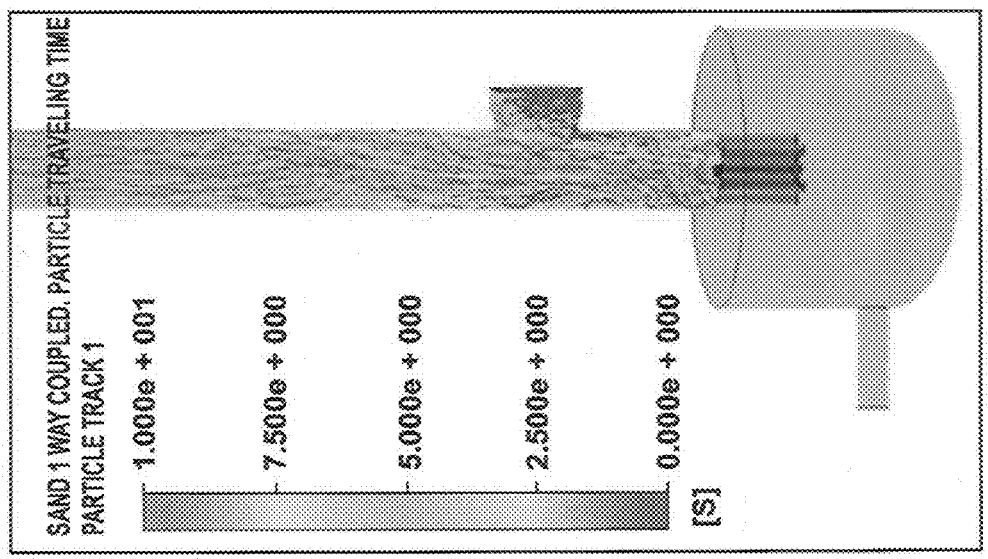
FIG. 10 illustrates particle movement in an exemplary reactor design having a distributor plate according to FIG. 8, according to one embodiment.

FIG. 10 illustrates particle movement in an exemplary reactor design having a distributor plate according to FIG. 8, according to one embodiment. The movement of particles is tracked in the first 10 seconds after the particles entered the reactor, based on standard reactor conditions and the flow of lift gas. Based on the legend, the lighter the gray, the longer the particle was captured in the diagram. Aside from the straight, upward travel of solid heat carrier particles, the distributor 800 also produced a high degree of random particle movement within the reactor. While the distributor 800 produced a concentrated lift gas stream that is able to bring a portion of solid heat carrier upward toward the reactor feed mixing zone, the higher and more concentrated lift gas stream also created more turbulence in regions of lower velocity. This turbulence resulted in the random movement, which increased the coverage area of solid heat carrier throughout the reactor. The effect of the random movement may include an increase in residence time of solid heat carrier in the reactor for more thorough thermal cracking, as well as decreasing the likelihood of reactor feed coating the wall, because there is a greater coverage of solid heat carriers to contact the reactor feed. Therefore, the theoretical benefits of the distributor 800 include greater level of thermal cracking, as well as a lesser chance solid particle deposition.

Figure 11:
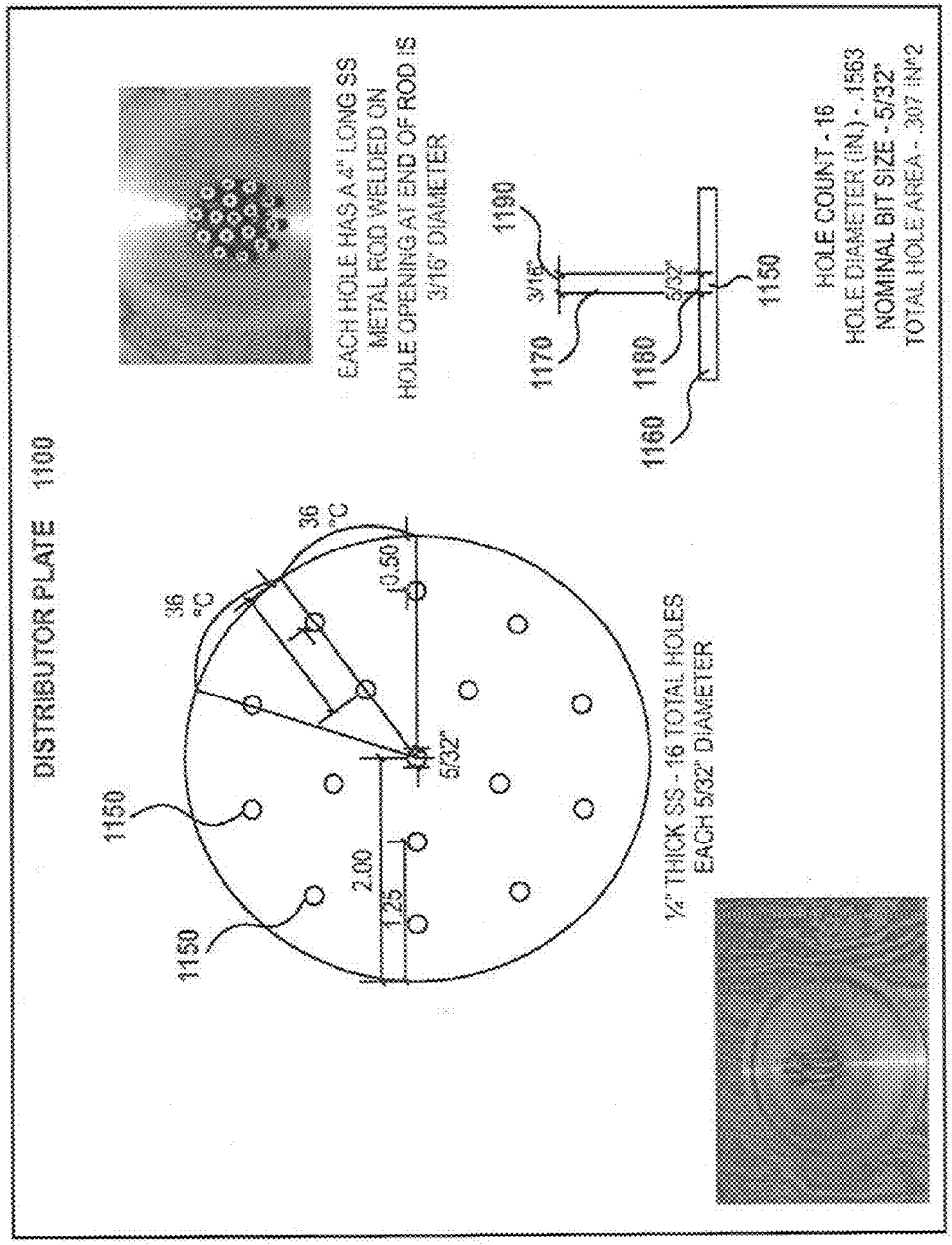
FIG. 11 illustrates a further exemplary embodiment of an improved distributor plate for use with the present system.

FIG. 11 illustrates a further exemplary embodiment of an improved distributor plate 1100 for use with the present system. Within an exemplary 4 inch diameter boundary (not shown), the distributor plate 1100 contains 16 (n) holes 1150 laid out in an evenly-distributed manner at a center section 1160 of the plate (not shown). Each hole 1150 is drilled perpendicular (90° angle) to the plate surface 1160, with a uniform size of 5/32 inch diameter (D) for each hole 1150. With the smaller number of moderately large holes 1150, the distributor 1100 creates gas streams at the reactor bottom with both higher velocity and wider flow path. On an underside of the distributor plate 1100, each hole 1150 has a rod (or tube) 1170 welded on a hole opening. Each rod has a proximal end 1180 welded to the plate surface 1160, and a distal end 1190. The diameter of the rod 1170 gradually increases from the proximal end 1180 to the distal end 1190. As an example, the diameter of the rod 1170 at the distal end 1190 is 3/16 inches.

Based on specifications detailed in FIG. 11, the cross-sectional area of one hole 1150 of the distributor 1100 can be calculated as follows:

$D$ = hole diameter = (5/32 in.) × (1 ft/12 in.) = 0.0130 ft $C_A$ = cross-sectional area of one hole
= $\pi \times (D/2)^2$
= $\pi \times (0.0130 \text{ ft})^2 \div 4$
= 0.000133 ft².

Knowing the lift gas volumetric flow rate, the superficial velocity of lift gas exiting through one of the 16 holes 1150 can be calculated as follows:

$F$ = 28 ft³/min $D$ = hole diameter = 0.0130 ft $n$ = number of holes = 16

$V_S$ = superficial velocity of lift gas out of one hole
= $F \div (n \times D)$
= (28 ft³/min) ÷ (16 × 0.000133 ft²) ÷ (60 s/min)
= 219 ft/s.

Therefore, an exemplary superficial velocity of lift gas discharged from one hole 1150 of the distributor plate 1100 is 219 ft/s.

Figure 12:
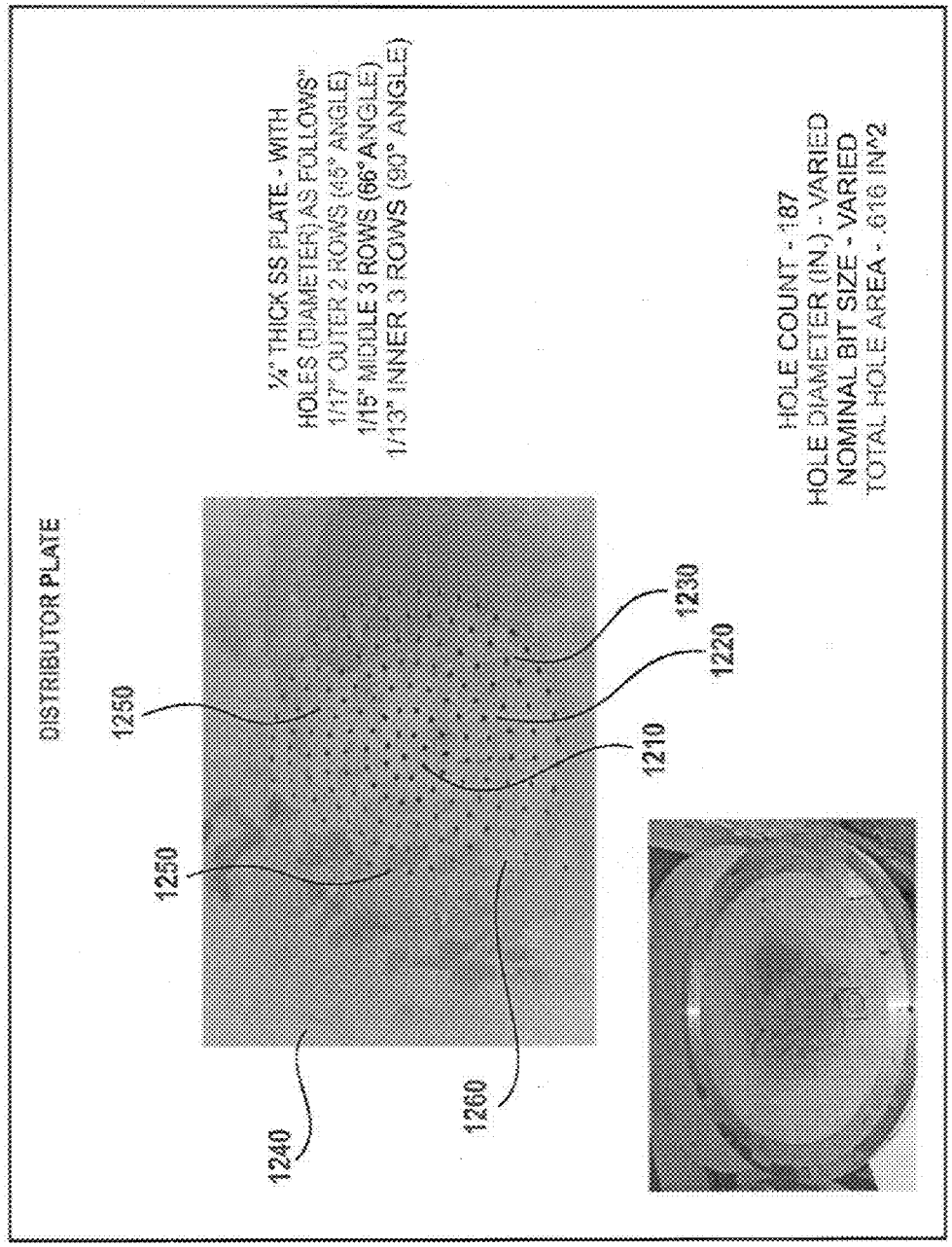
FIG. 12 illustrates a further exemplary embodiment of an improved distributor plate for use with the present system.

FIG. 12 illustrates a further exemplary embodiment of an improved distributor plate 1200 for use with the present system. Within an exemplary 4 inch diameter boundary (not shown), the distributor 1200 contains 187 (n) holes 1250 laid out in an evenly-distributed manner at a center section 1260 of the plate 1240. There are 3 different sizes of holes drilled to the distributor 1200, with each set drilled at a different angle. The first set is the inner 3 rows of holes 1210, with 1/13″ diameter holes drilled perpendicular (90° angle) to the plate surface 1240. The second set is the middle 3 rows of holes 1220, with 1/15″ diameter holes drilled in a 66° angle to the plate surface 1220, facing away from the reactor center. The third set is the outer 2 rows of holes 1230, with 1/17″ diameter holes drilled in a 45° angle to the plate surface 1240, facing away from the reactor center. With a high number of small holes, the distributor 1200 disperses the lift gas inside the reactor and directs some of the flow toward the wall.

Based on specifications detailed in FIG. 12, the cross-sectional area of one hole 1250 of the distributor 1200 can be calculated as follows:

$D_1$ = 1/13″ hole diameter
= (1/13 in.) × (1 ft/12 in.)
= 0.00641 ft $D_2$ = 1/15″ hole diameter
= (1/15 in.) × (1 ft/12 in.)
= 0.00556 ft $D_3$ = 1/17″ hole diameter
= (1/17 in.) × (1 ft/12 in.)
= 0.00490 ft $C_{A1}$ = cross-sectional area of 1/13″ hole (90°)
= $\pi \times (D_1/2)^2$
= $\pi \times (0.00641 \text{ ft})^2 \div 4$
= 0.0000323 ft²

$C_{A2}$ = cross-sectional area of 1/15″ hole (66°)
$= \pi \times (D_2/2) \times [(D_2/\sin(66°))/2]$
$= \pi \times (D_2^2/\sin(66°)/4)$
$= \pi \times (0.00556 \text{ ft})^2 \div \sin(66°) \div 4$
$= 0.0000266 \text{ ft}^2$ $C_{A3}$ = cross-sectional area of 1/17″ hole (45°)
$= \pi \times (D_3/2) \times [(D_3/\sin(45°))/2]$
$= \pi \times (D_3^2/\sin(45°)/4)$
$= \pi \times (0.00490 \text{ ft})^2 \div \sin(45°) \div 4$
$= 0.0000267 \text{ ft}^2$.

Knowing the lift gas volumetric flow rate, the superficial velocity of lift gas exiting through one of the holes 1250 can be calculated as follows:

$F = 28 \text{ ft}^3/\text{min}$ $C_{A1}$ = cross-sectional area of 1/13″ hole (90°)
$= 0.0000323 \text{ ft}^2$ $C_{A2}$ = cross-sectional area of 1/15″ hole (66°)
$= 0.0000266 \text{ ft}^2$ $C_{A3}$ = cross-sectional area of 1/17″ hole (45°)
$= 0.0000267 \text{ ft}^2$ $n_1$ = number of 1/13″ holes = 24

$n_2$ = number of 1/15″ holes = 80

$n_3$ = number of 1/17″ holes = 83

$C_A$ = total cross-sectional area of Distributor V
$= (n_1 \times C_{A1}) + (n_2 \times C_{A2}) + (n_3 \times C_{A3})$
$= (24 \times 0.0000323 \text{ ft}^2) + (80 \times 0.0000266 \text{ ft}^2) +$
$(83 \times 0.0000267 \text{ ft}^2)$
$= 0.00512 \text{ ft}^2$ $F_1 = F \times n_1 \times C_{A1} \div C_A$
$= (28 \text{ ft}^3/\text{min}) \times 24 \times (0.0000323 \text{ ft}^2) \div (0.00512 \text{ ft}^2)$
$= 4.24 \text{ ft}^3/\text{min}$ $F_2 = F \times n_2 \times C_{A2} \div C_A$
$= (28 \text{ ft}^3/\text{min}) \times 80 \times (0.0000266 \text{ ft}^2) \div (0.00512 \text{ ft}^2)$
$= 11.6 \text{ ft}^3/\text{min}$ $F_3 = F \times n_3 \times C_{A3} \div C_A$
$= (28 \text{ ft}^3/\text{min}) \times 83 \times (0.0000267 \text{ ft}^2) \div (0.00512 \text{ ft}^2)$
$= 12.1 \text{ ft}^3/\text{min}$ $V_{S1}$ = superficial velocity of lift gas out of 1/13″
$= F_1 \div (n_1 \times C_{A1})$
$= (4.24 \text{ ft}^3/\text{min}) \div (24 \times 0.0000323 \text{ ft}^2) \div (60 \text{ s/min})$
$= 91.2 \text{ ft/s}$ $V_{S2}$ = superficial velocity of lift gas out of 1/15″
$= F_2 \div (n_2 \times C_{A2})$
$= (11.6 \text{ ft}^3/\text{min}) \div (80 \times 0.0000266 \text{ ft}^2) \div (60 \text{ s/min})$
$= 90.9 \text{ ft/s}$ $V_{S3}$ = superficial velocity of lift gas out of 1/17″
$= F_3 \div (n_3 \times C_{A3})$
$= (12.1 \text{ ft}^3/\text{min}) \div (83 \times 0.0000267 \text{ ft}^2) \div (60 \text{ s/min})$
$= 91.0 \text{ ft/s}$ Therefore, an exemplary superficial velocity of lift gas discharged from a hole in distributor 1200 is 91.2 ft/s for the 1/13″ hole (1210), 90.9 ft/s for the 1/15″ hole (1220), and 91.0 ft/s for the 1/17″ hole (1230).

Different configurations of reactor feed nozzle and lift gas distributor plates were tested to determine impacts of the lift gas distributor plates described herein. Athabasca Bitumen is a very heavy oil produced from the oil sands near Fort McMurray, Alberta, Canada. Belridge is a heavy oil produced near Bakersfield, Calif. EHOS (Exploratory Heavy Oil Sample) is a sample from an exploratory well that was provided for technology demonstration. The EHOS sample was from initial field production and unique to that activity and was from one sampling campaign. The EHOS sample is only representative of the sample itself. UHOS (Unidentified Heavy Oil Sample) is a sample from a heavy oil processing site that was received without designation of source or origin. The UHOS was treated as a blind sample for technology demonstration. API Gravities were measured in accordance with ASTM D70. Viscosities were measured in accordance with ASTM D445. "C7A" represents C7 Asphaltenes in the tables that follow. C7 Asphaltenes were measured in accordance with ASTM D3279. Vanadium and Nickel Content were measured by Inductively Coupled Plasma Mass Spectroscopy (ICP-MS) in accordance with ASTM D5185. Boiling Ranges were calculated based on a High Temperature Simulated Distillation (HTSD) in accordance with ASTM D6352. Boiling ranges in the tables that follow for baseline feed and product were estimated from distillation cut points presented in U.S. Pat. No. 7,572,365. In the tables that follow, "nr" represents a measurement that was not reported.

The exemplary feed nozzle referred to herein as Nozzle I is a prior art feed nozzle design including a feed nozzle inserted horizontally into a tubular reactor. The feed nozzle is positioned perpendicular (a right angle or 90 degrees) to a vertical flow direction of lift gas and solid heat carrier. The distributor plates that were paired with the same type of feed nozzle for Belridge Heavy Oil Sample (BHOS) Runs are shown in Table 2. A representative run was assigned for each configuration, based on the nominal API gravity and liquid weight yield of a particular configuration.

TABLE 2

| BHOS Runs Nozzle-Distributor Combinations | | |
|---|---|---|
| Representative Run | Feed Nozzle | Distributor Plate |
| B031.B | Nozzle I | Distributor 400 |
| B011.A | Nozzle I | Distributor 800 |

With the goal of the reactor system to convert heavy oil feedstock into light end product, the degree of success for a particular configuration is determined by the measurable properties of the run as well as the product.

The main property of concern is the liquid weight yield, which is defined as the percentage of feedstock that remains in liquid phase. In a thermal cracking unit, there can be products in the liquid, gas, and solid (coke) phases. The higher the liquid weight yield, the better. The liquid yield is the most valuable result of thermal cracking.

After liquid yield, a product property of concern is the API gravity, which is related to the density of the product and gives an indication of the "lightness" of the product. The higher the API value, the lighter the product, and thus the more success the thermal cracking process has achieved.

The other product properties of interest are the viscosity, vanadium removal, and nickel removal. The viscosity measures the "thickness" of the product, and is a practical indication of the transportability of the product. In many cases, viscosity reduction is more important than API. Vanadium and nickel are two notable metals that form chemical complexes that are detrimental in refinery processes, and the lower amount contained in the product the better.

Table 3 shows the properties of whole crude used in the different Belridge Heavy Oil Sample (BHOS) runs. Table 4 shows the properties of product (synthetic crude oil or SCO) used in the Belridge Heavy Oil Sample (BHOS) runs. Table 5 summarizes the properties from the baseline with properties from different Belridge Heavy Oil Sample (BHOS) runs.

TABLE 4

BHOS Runs Product Properties

| Synthetic Crude Oil Property | Baseline | Distributor 400 | Distributor 800 |
| --- | --- | --- | --- |
| API Gravity | 12.9 | 15.5 | 16.9 |
| Viscosity @ 40° C., cSt | 201 | 62.8 | 63.6 |
| Viscosity @ 100° C., cSt | nr | 9.11 | 6.45 |
| C7 Asphaltenes, wt % | nr | nr | nr |
| Vanadium Content, ppm | 88.0 | 25.6 | 27.7 |
| Nickel Content, ppm | 24.0 | 22.1 | 26.1 |
| Boiling Ranges [1] | | | |
| <200° F. Content, wt % | 0.177 | 0.00 | 0.00 |
| 200-350° F. Content, wt % | 1.92 | 1.64 | 2.85 |
| 350-500° F. Content, wt % | 7.33 | 10.9 | 9.74 |
| 500-650° F. Content, wt % | 8.25 | 23.2 | 21.2 |
| 650+ ° F. Content, wt % | 82.3 | 64.3 | 66.2 |
| 650-850° F. Content, wt % | 25.7 | 34.2 | 42.6 |
| 850-1000° F. Content, wt % | 19.4 | 15.4 | 16.7 |
| 1000+ ° F. Content, wt % | 37.2 | 14.7 | 6.91 |
| 1000-1200° F. Content, wt % | 21.3 | 4.01 | 6.28 |
| 1200+ ° F. Content, wt % | 15.9 | 10.7 | 0.630 |

TABLE 5

BHOS Run Comparison of Distributor Plates

| Distributor | Run ID | API | Liquid Yield, wt % | Liquid Yield, vol % | 1000+ Removal, wt % | C7A Removal, wt % | Viscosity Reduction, % | V Removal, wt % | Ni Removal, wt % |
| --- | --- | --- | --- | --- | --- | --- | --- | --- | --- |
| Baseline | nr | 12.9 | 74.4 | nr | 49.9 | nr | 99.5 | 68.7 | 79.2 |
| 400 | B031B | 15.5 | 77.5 | 80.3 | 64.6 | nr | 94.6 | 69.0 | 66.7 |
| 800 | B011A | 16.9 | 82.5 | 84.9 | 82.3 | nr | 94.5 | 64.3 | 58.2 |

TABLE 3

BHOS Runs Whole Crude Properties

| Whole Crude Property | Baseline | Distributor 400 | Distributor 800 |
| --- | --- | --- | --- |
| API Gravity | 8.6 | 13.2 | 13.2 |
| Viscosity @ 40° C., cSt | 40000 | 1155 | 1155 |
| Viscosity @ 100° C., cSt | nr | 31.7 | 31.7 |
| C7 Asphaltenes, wt % | nr | 2.83 | 2.83 |
| Vanadium Content, ppm | 209 | 64.0 | 64.0 |
| Nickel Content, ppm | 86.0 | 51.5 | 51.5 |
| Boiling Ranges | | | |
| <200° F. Content, wt % | 0.00 | 0.240 | 0.240 |
| 200-350° F. Content, wt % | 0.0396 | 0.180 | 0.180 |
| 350-500° F. Content, wt % | 3.60 | 7.87 | 7.87 |
| 500-650° F. Content, wt % | 5.09 | 14.7 | 14.7 |
| 650+ ° F. Content, wt % | 91.3 | 77.0 | 77.0 |
| 650-850° F. Content, wt % | 20.4 | 25.6 | 25.6 |
| 850-1000° F. Content, wt % | 15.7 | 19.2 | 19.2 |
| 1000+ ° F. Content, wt % | 55.2 | 32.2 | 32.2 |
| 1000-1200° F. Content, wt % | 20.6 | 12.8 | 12.8 |
| 1200+ ° F. Content, wt % | 34.6 | 19.4 | 19.4 |

As can be seen in Table 5, both runs using distributors 400 and 800 show at least one area of improvement over the prior art baseline. Therefore, distributors 400 and 800 are preferred distributor plates.

TABLE 6

BHOS Run Properties Comparison

| Run Property | Baseline | Distributor 400 | Distributor 800 |
| --- | --- | --- | --- |
| Liquid Volume Yield, vol % | nr | 80.3 | 84.9 |
| Liquid Weight Yield, wt % | 74.4 | 77.5 | 82.5 |

TABLE 7

BHOS Product Properties Comparison

| Synthetic Crude Oil Property | Baseline | Distributor 400 | Distributor 800 |
| --- | --- | --- | --- |
| API Gravity | 12.9 | 15.5 | 16.9 |
| Viscosity Reduction, % | 99.5 | 94.6 | 94.5 |

TABLE 7-continued

BHOS Product Properties Comparison

| Synthetic Crude Oil Property | Baseline | Distributor 400 | Distributor 800 |
|---|---|---|---|
| C7 Asphaltenes Removal, wt % | nr | nr | nr |
| Vanadium Removal, wt % | 68.7 | 69.0 | 64.3 |
| Nickel Removal, wt % | 79.2 | 66.7 | 58.2 |
| 1000° F.+ Material Removal, wt % | 49.9 | 64.6 | 82.3 |

Based on properties produced by each distributor plate shown in Table 6, distributor 800 demonstrates greater success in liquid retention.

Based on product properties of each configuration shown in Table 7, distributor 800 demonstrates superior product properties in areas of API and asphaltenes content, as well as near the best in viscosity.

Combining the assessment of both run and product properties, distributor 800 is superior in producing high liquid yield and API. Production of high liquid yield and API are the two most important properties for the present thermal cracking process, due to their direct reflection of the value of the process as well as product. Therefore, distributor 800 is a preferred distributor plate for Belridge Heavy Oil Sample (BHOS) runs.

Table 8 lists distributor plates that were paired with the same type of feed nozzle for Exploratory Heavy Oil Sample (EHOS) Runs. A representative run was assigned for each configuration, based on the nominal API gravity and liquid weight yield of a particular configuration.

TABLE 8

EHOS Runs Nozzle-Distributor Combinations

| Representative Run | Feed Nozzle | Distributor Plate |
|---|---|---|
| E045.B | Nozzle I | Distributor 700 |
| E045.A | Nozzle I | Distributor 1100 |

With the goal of the reactor system to convert heavy oil feedstock into light end products, the degree of success for a particular configuration is determined by the measurable properties of the run as well as the product. Table 9 shows the properties of whole crude used in the baseline as well as the different Exploratory Heavy Oil Sample (EHOS) Runs. Table 10 shows the properties of product (synthetic crude oil) used in the baseline as well as the different Exploratory Heavy Oil Sample (EHOS) runs. Table 11 summarizes the properties from the baseline with properties from different Exploratory Heavy Oil Sample (EHOS) runs.

TABLE 9

EHOS Runs Whole Crude Properties

| Whole Crude Property | Distributor 700 | Distributor 1100 |
|---|---|---|
| API Gravity | 7.7 | 7.7 |
| Viscosity @ 40° C., cSt | nr | nr |
| Viscosity @ 100° C., cSt | 657 | 657 |
| C7 Asphaltenes, wt % | 13.8 | 13.8 |
| Vanadium Content, ppm | 458 | 458 |
| Nickel Content, ppm | 151 | 151 |
| Boiling Ranges | | |
| <200° F. Content, wt % | 0.00 | 0.00 |
| 200-350° F. Content, wt % | 0.00 | 0.00 |
| 350-500° F. Content, wt % | 1.88 | 1.88 |
| 500-650° F. Content, wt % | 9.22 | 9.22 |
| 650+ ° F. Content, wt % | 88.9 | 88.9 |
| 650-850° F. Content, wt % | 17.6 | 17.6 |
| 850-1000° F. Content, wt % | 13.6 | 13.6 |
| 1000+ ° F. Content, wt % | 57.7 | 57.7 |
| 1000-1200° F. Content, wt % | 18.3 | 18.3 |
| 1200+ ° F. Content, wt % | 39.4 | 39.4 |

TABLE 10

EHOS Runs Product Properties

| SCO Property | Distributor 700 | Distributor 1100 |
|---|---|---|
| API Gravity | 14.8 | 15.7 |
| Viscosity @ 40° C., cSt | 33.5 | 36.4 |
| Viscosity @ 100° C., cSt | 6.80 | 6.20 |
| C7 Asphaltenes, wt % | 5.23 | 4.08 |
| Vanadium Content, ppm | 79.2 | 114 |
| Nickel Content, ppm | 25.1 | 38.2 |
| Boiling Ranges | | |
| <200° F. Content, wt % | 0.00 | 0.00 |
| 200-350° F. Content, wt % | 4.18 | 4.60 |
| 350-500° F. Content, wt % | 12.9 | 9.41 |
| 500-650° F. Content, wt % | 23.7 | 19.4 |
| 650+ ° F. Content, wt % | 59.2 | 66.6 |
| 650-850° F. Content, wt % | 36.6 | 33.6 |
| 850-1000° F. Content, wt % | 15.0 | 14.4 |
| 1000+ ° F. Content, wt % | 7.62 | 18.6 |
| 1000-1200° F. Content, wt % | 4.11 | 5.58 |
| 1200+ ° F. Content, wt % | 3.51 | 13.0 |

TABLE 11

EHOS Runs Comparison of Distributor Plates

| Distributor | Run ID | API | Liquid Yield, wt % | Liquid Yield, vol % | 1000+ Removal, wt % | C7A Removal, wt % | Viscosity Reduction, % | V Removal, wt % | Ni Removal, wt % |
|---|---|---|---|---|---|---|---|---|---|
| 700 | E045B | 14.8 | 62.7 | 67.5 | 91.7 | 76.2 | 99.0 | 89.2 | 89.6 |
| 1100 | E045A | 15.7 | 69.6 | 74.6 | 77.6 | 79.4 | 99.1 | 82.7 | 82.4 |

Table 12 compares the run properties of Exploratory Heavy Oil Sample (EHOS) run distributor plates. Table 13 compares the product properties of Exploratory Heavy Oil Sample (EHOS) run distributor plates.

TABLE 12

EHOS Run Properties Comparison

| Run Property | Distributor 700 | Distributor 1100 |
|---|---|---|
| Liquid Volume Yield, vol % | 67.5 | 74.6 |
| Liquid Weight Yield, wt % | 62.7 | 69.6 |

TABLE 13

EHOS Product Properties Comparison

| SCO Property | Distributor 700 | Distributor 1100 |
|---|---|---|
| API Gravity | 14.8 | 15.7 |
| Viscosity Reduction, % | 99.0 | 99.1 |
| C7 Asphaltenes Removal, wt % | 76.2 | 79.4 |
| Vanadium Removal, wt % | 89.2 | 82.7 |
| Nickel Removal, wt % | 89.6 | 82.4 |
| 1000° F.+ Material Removal, wt % | 91.7 | 77.6 |

Based on run properties produced by each distributor plate shown in Table 12, distributor 1100 demonstrates greater success in liquid retention.

Based on product properties produced by each distributor plate shown in Table 13, distributor 1100 produced a higher API and lower asphaltenes content.

Combining the assessment of both run and product properties, distributor 1100 is superior in producing higher liquid yield and API. Production of higher liquid yield and API are the two most important properties for the present thermal cracking process, due to their direct reflection of the value of the process as well as product. Therefore, distributor 1100 is a preferred distributor plate for Exploratory Heavy Oil Sample (EHOS) runs.

Table 14 lists lift gas distributor plates that were paired with the same type of feed nozzle for Unidentified Heavy Oil Sample (UHOS) Runs. A representative run was assigned for each configuration, based on the nominal API gravity and liquid weight yield of a particular configuration.

TABLE 14

UHOS Runs Nozzle-Distributor Combinations

| Representative Run | Feed Nozzle | Distributor Plate |
|---|---|---|
| U038.A | Nozzle I | Distributor 1100 |
| U037.B | Nozzle I | Distributor 1200 |

With the goal of the reactor system to convert heavy oil feedstock into light end products, the degree of success for a particular configuration is determined by the measurable properties of the run as well as the product. Table 15 shows the properties of whole crude used in the different Unidentified Heavy Oil Sample (UHOS) Runs. Table 16 shows the properties of product used in the different Unidentified Heavy Oil Sample (UHOS) runs. Table 17 summarizes the properties from different Unidentified Heavy Oil Sample (UHOS) runs.

TABLE 15

UHOS Runs Whole Crude Properties

| Whole Crude Property | Distributor 1100 | Distributor 1200 |
|---|---|---|
| API Gravity | 11.3 | 10.8 |
| Viscosity @ 40° C., cSt | 5717 | 4725 |
| | | Error! Bookmark not defined. |
| Viscosity @ 100° C., cSt | 143 | 147 |
| C7 Asphaltenes, wt % | 16.9 | 17.3 |
| Vanadium Content, ppm | 435 | 450 |
| Nickel Content, ppm | 81.1 | 83.3 |
| Boiling Ranges | | |
| <200° F. Content, wt % | 0.237 | 0.302 |
| 200-350° F. Content, wt % | 4.27 | 3.39 |
| 350-500° F. Content, wt % | 6.19 | 5.70 |
| 500-650° F. Content, wt % | 8.40 | 9.29 |
| 650+ ° F. Content, wt % | 80.9 | 81.3 |
| 650-850° F. Content, wt % | 13.0 | 13.4 |
| 850-1000° F. Content, wt % | 10.2 | 13.7 |
| 1000+ ° F. Content, wt % | 57.7 | 54.2 |
| 1000-1200° F. Content, wt % | 17.4 | 17.7 |
| 1200+ ° F. Content, wt % | 40.3 | 36.5 |

TABLE 16

UHOS Runs Product Properties

| SCO Property | Distributor 1100 | Distributor 1200 |
|---|---|---|
| API Gravity | 13.7 | 19.2 |
| Viscosity @ 40° C., cSt | 118 | 24.6 |
| Viscosity @ 100° C., cSt | 20.7 | 4.59 |
| C7 Asphaltenes, wt % | 8.84 | 2.52 |
| Vanadium Content, ppm | 197 | 72.2 |
| Nickel Content, ppm | 33.0 | 10.2 |
| Boiling Ranges | | |
| <200° F. Content, wt % | 0.00 | 0.00 |
| 200-350° F. Content, wt % | 4.52 | 6.41 |
| 350-500° F. Content, wt % | 9.64 | 12.6 |
| 500-600° F. Content, wt % | 15.4 | 20.7 |
| 650+ ° F. Content, wt % | 70.4 | 60.3 |
| 650-850° F. Content, wt % | 23.9 | 29.5 |
| 850-1000° F. Content, wt % | 15.1 | 16.7 |
| 1000+ ° F. Content, wt % | 31.4 | 14.1 |
| 1000-1200° F. Content, wt % | 11.6 | 5.16 |
| 1200+ ° F. Content, wt % | 19.8 | 8.93 |

TABLE 17

UHOS Runs Comparison of Distributor Plates

| Distributor | Run ID | API | Liquid Yield, wt % | Liquid Yield, vol % | 1000+ Removal, wt % | C7A Removal, wt % | Viscosity Reduction, % | V Removal, wt % | Ni Removal, wt % |
|---|---|---|---|---|---|---|---|---|---|
| 1100 | U038A | 13.7 | 73.6 | 75.7 | 59.9 | 61.5 | 97.9 | 66.7 | 70.1 |
| 1200 | U037B | 19.2 | 66.8 | 70.4 | 82.6 | 90.3 | 99.5 | 89.3 | 91.8 |

TABLE 18

UHOS Run Properties Comparison

| Run Property | Distributor 1100 | Distributor 1200 |
|---|---|---|
| Liquid Volume Yield, vol % | 75.7 | 70.4 |
| Liquid Weight Yield, wt % | 73.6 | 66.8 |

TABLE 19

UHOS Product Properties Comparison

| SCO Property | Distributor 1100 | Distributor 1200 |
|---|---|---|
| API Gravity | 13.7 | 19.2 |
| Viscosity Reduction, % | 97.9 | 99.5 |
| C7 Asphaltenes Removal, wt % | 61.5 | 90.3 |
| Vanadium Removal, wt % | 66.7 | 89.3 |
| Nickel Removal, wt % | 70.1 | 91.8 |
| 1000° F.+ Material Removal, wt % | 59.9 | 82.6 |

Based on run properties produced by each distributor plate shown in Table 18, distributor 1100 demonstrates the highest liquid retention. Distributor 1100 is a preferred distributor plate.

Based on product properties of each configuration shown in Table 19, distributor 1200 demonstrates superior product properties across the board, in areas of API, viscosity, asphaltenes content, removal of heavy material, as well as metal removal.

Combining the assessment of both run and product properties, distributor 1100 is superior in producing high liquid yield, while distributor 1200 is superior in producing high API, viscosity, and removal of heavy material and metals, and low viscosity and asphaltenes content. Therefore, for Unidentified Heavy Oil Sample (UHOS) Runs, distributor 1100 is a preferred distributor plate in producing high liquid yield, while distributor 1200 is a preferred distributor plate in producing the highest quality product.

Different configurations of reactor feed nozzle and lift gas distributor plates were tested. A complete discussion of each feed nozzle referred to herein can be found in U.S. patent application Ser. No. 13/340,487 which is hereby incorporated by reference in its entirety for all purposes. Table 20 summarizes a numbered selection of the feed nozzle and distributor plate combinations used in Athabasca Bitumen Runs. A representative run was assigned for each configuration, based on the nominal API gravity and liquid weight yield of a particular configuration.

TABLE 20

Athabasca Bitumen Run Nozzle-Distributor Combinations

| Configuration # | Representative Run | Feed Nozzle | Distributor Plate |
|---|---|---|---|
| 1 | A022.A | Nozzle 700 | Distributor 400 |
| 2 | A013.A | Nozzle 1300 | Distributor 800 |
| 3 | A024.B | Nozzle 1500 | Distributor 400 |
| 4 | A032.A | Nozzle 1700 | Distributor 400 |
| 5 | A034.B | Nozzle 2000 | Distributor 400 |

Table 21 shows the properties of whole crude used in the baseline as well as the different Athabasca Bitumen run configurations. Table 22 shows the properties of product (SCO or synthetic crude oil) used in the different Athabasca Bitumen run configurations. Table 23 summarizes the properties from different Athabasca Bitumen run configurations.

TABLE 21

Athabasca Bitumen Runs Whole Crude Properties

| Whole Crude Property | Baseline | 1 | 2 | 3 | 4 | 5 |
|---|---|---|---|---|---|---|
| API Gravity | 8.6 | 8.1 | 8.9 | 8.2 | 7.7 | 7.7 |
| Viscosity @ 40° C., cSt | 40000 | nr | nr | 18199 | 17854 | 17854 |
| Viscosity @ 100° C., cSt | nr | 161 | 179 | 201 | 211 | 211 |
| C7 Asphaltenes, wt % | nr | 10.7 | 15.7 | 11.9 | 11.9 | 11.9 |
| Vanadium Content, ppm | 209 | 211 | 214 | 223 | 224 | 224 |
| Nickel Content, ppm | 86.0 | 80.6 | 83.4 | 82.3 | 82.3 | 82.3 |
| Boiling Ranges | | | | | | |
| <200° F. Content, wt % | 0.00 | 0.00 | 0.00 | 0.00 | 0.00 | 0.00 |
| 200-350° F. Content, wt % | 0.0396 | 0.181 | 0.00 | 0.0249 | 0.237 | 0.237 |
| 350-500° F. Content, wt % | 3.60 | 4.88 | 4.97 | 5.91 | 3.51 | 3.51 |
| 500-650° F. Content, wt % | 5.09 | 12.6 | 11.6 | 13.6 | 9.43 | 9.43 |
| 650+° F. Content, wt % | 91.3 | 82.3 | 83.4 | 80.5 | 86.8 | 86.8 |
| 650-850° F. Content, wt % | 20.4 | 24.2 | 21.3 | 24.9 | 17.9 | 17.9 |
| 850-1000° F. Content, wt % | 15.7 | 17.4 | 14.8 | 17.1 | 12.9 | 12.9 |
| 1000+° F. Content, wt % | 55.2 | 40.7 | 47.4 | 38.5 | 56.0 | 56.0 |

TABLE 22

Athabasca Bitumen Runs Product Properties

| SCO Property | Baseline | 1 | 2 | 3 | 4 | 5 |
|---|---|---|---|---|---|---|
| API Gravity | 12.9 | 13.3 | 18.1 | 17.5 | 12.6 | 12 |
| Viscosity @ 40° C., cSt | 201 | nr | nr | 34.7 | 119 | 150 |
| Viscosity @ 100° C., cSt | nr | nr | 4.86 | 4.86 | 11.0 | 11.2 |
| C7 Asphaltenes, wt % | nr | 6.16 | 6.19 | 1.37 | 5.73 | 5.57 |
| Vanadium Content, ppm | 88.0 | 97.9 | 20.1 | 16.5 | 52.6 | 48.6 |
| Nickel Content, ppm | 24.0 | 34.5 | 10.9 | 5.78 | 22.6 | 19.0 |
| Boiling Ranges | | | | | | |
| <200° F. Content, wt % | 0.177 | 0.00 | 0.00 | 0.00 | 0.00 | 0.00 |
| 200-350° F. Content, wt % | 1.92 | 2.84 | 1.16 | 2.07 | 1.33 | 1.82 |
| 350-500° F. Content, wt % | 7.33 | 14.1 | 6.92 | 9.09 | 7.18 | 6.75 |
| 500-650° F. Content, wt % | 8.25 | 23.6 | 21.1 | 25.9 | 19.7 | 18.4 |
| 650+° F. Content, wt % | 82.3 | 59.5 | 70.8 | 62.9 | 71.8 | 73.0 |
| 650-850° F. Content, wt % | 25.7 | 33.1 | 50.7 | 41.0 | 35.7 | 37.3 |
| 850-1000° F. Content, wt % | 19.4 | 13.4 | 13.3 | 16.7 | 20.3 | 21.7 |
| 1000+° F. Content, wt % | 37.2 | 13.0 | 6.82 | 5.24 | 15.8 | 14.0 |

TABLE 23

Athabasca Bitumen Run Comparison

| Configuration | Run ID | API | Liquid Yield, wt % | Liquid Yield, vol % | 1000+ Removal, wt % | C7A Removal, wt % | Viscosity Reduction, % | V Removal, wt % | Ni Removal, wt % |
|---|---|---|---|---|---|---|---|---|---|
| Baseline | nr | 12.9 | 74.4 | nr | 49.9 | nr | 99.5 | 68.7 | 79.2 |
| 1 | A022A | 13.3 | 73.3 | 76.6 | 76.6 | 57.8 | nr | 66.0 | 68.6 |
| 2 | A013A | 18.1 | 95.5 | 104 | 86.2 | 62.3 | 97.3 | 91.0 | 87.5 |
| 3 | A024B | 17.5 | 78.6 | 83.9 | 89.3 | 91.0 | 99.8 | 94.2 | 94.5 |
| 4 | A032A | 12.6 | 85.7 | 89.1 | 75.8 | 58.7 | 99.3 | 79.9 | 76.5 |
| 5 | A034B | 12.0 | 80.9 | 84.0 | 79.8 | 62.1 | 99.2 | 82.4 | 81.3 |

As shown in Table 23, all 5 configurations show at least one area of improvement over the baseline. Therefore, configurations 1, 2, 3, 4, and 5 are all preferred configurations.

TABLE 24

Whole Crude Basis Run Properties Comparison

| Run Property | Baseline | 1 | 2 | 3 | 4 | 5 |
|---|---|---|---|---|---|---|
| Liquid Volume Yield, vol % | nr | 76.6 | 104 | 83.9 | 89.1 | 84.0 |
| Liquid Weight Yield, wt % | 74.4 | 73.3 | 95.5 | 78.6 | 85.7 | 80.9 |

TABLE 25

Product Properties Comparison

| SCO Property | Baseline | 1 | 2 | 3 | 4 | 5 |
|---|---|---|---|---|---|---|
| API Gravity | 12.9 | 13.3 | 18.1 | 17.5 | 12.6 | 12.0 |
| Viscosity Reduction, % | 99.5 | nr | 97.3 | 99.8 | 99.3 | 99.2 |
| C7 Asphaltenes Removal, wt % | nr | 57.8 | 62.3 | 91.0 | 58.7 | 62.1 |
| Vanadium Removal, wt % | 68.7 | 66.0 | 91.0 | 94.2 | 79.9 | 82.4 |
| Nickel Removal, wt % | 79.2 | 68.6 | 87.5 | 94.5 | 76.5 | 81.3 |
| 1000+° F. Material Removal, wt % | 49.9 | 76.6 | 86.2 | 89.3 | 75.8 | 79.8 |

Based on run properties of each configuration shown in Table 24, configuration 2 demonstrates greater success in liquid retention. The yield figures suggest that configurations 2, 3, 4, and 5 all have superior liquid yield. Configuration 2 is clearly superior to the other configurations due to higher liquid yield.

Based on product properties of each configuration shown in Table 25, configurations 2 and 3 demonstrate better product properties across the board, compared to all 5 configurations. In terms of API, viscosity reduction, removal of heavy fraction, asphaltenes removal, and metals removal, configurations 2 and 3 show the most significant improvement in most or all areas.

Combining the assessment of both liquid yield and product properties, only configuration 2 demonstrates superior performance in both areas. Therefore, configuration 2 (Nozzle 1300+Distributor 800 combination) is the most preferred configuration, for Athabasca Bitumen Runs.

Table 26 summarizes numbered feed nozzle and distributor plate combinations used in Belridge Heavy Oil Sample (BHOS) Runs. A representative run was assigned for each configuration, based on the nominal API gravity and liquid weight yield of a particular configuration.

TABLE 26

BHOS Runs Nozzle-Distributor Combinations

| Configuration | Representative Run | Feed Nozzle | Distributor Plate |
|---|---|---|---|
| 6 | B031.B | Nozzle 700 | Distributor 400 |
| 7 | B011.A | Nozzle 700 | Distributor 800 |
| 8 | B031.A | Nozzle 1300 | Distributor 400 |

Table 27 shows the properties of whole crude used in the baseline as well as the different BHOS run configurations.

Table 28 shows the properties of product (SCO or synthetic crude oil) used in the different BHOS run configurations. Table 29 summarizes the properties from different BHOS Run configurations.

TABLE 27

BHOS Runs Whole Crude Properties

| Whole Crude Property | Baseline | 6 | 7 | 8 |
|---|---|---|---|---|
| API Gravity | 8.6 | 13.2 | 13.2 | 13.2 |
| Viscosity @ 40° C., cSt | 40000 | 1155 | 1155 | 1155 |
| Viscosity @ 100° C., cSt | nr | 31.7 | 31.7 | 31.7 |
| C7 Asphaltenes, wt % | nr | 2.83 | 2.83 | 2.83 |
| Vanadium Content, ppm | 209 | 64.0 | 64.0 | 64.0 |
| Nickel Content, ppm | 86.0 | 51.5 | 51.5 | 51.5 |
| Boiling Ranges | | | | |
| <200° F. Content, wt % | 0.00 | 0.24 | 0.24 | 0.24 |
| 200-350° F. Content, wt % | 0.04 | 0.18 | 0.18 | 0.18 |
| 350-500° F. Content, wt % | 3.60 | 7.87 | 7.87 | 7.87 |
| 500-650° F. Content, wt % | 5.09 | 14.7 | 14.7 | 14.7 |
| 650+° F. Content, wt % | 91.3 | 77.0 | 77.0 | 77.0 |
| 650-800° F. Content, wt % | 20.4 | 25.6 | 25.6 | 25.6 |
| 850-1000° F. Content, wt % | 15.7 | 19.2 | 19.2 | 19.2 |
| 1000+° F. Content, wt % | 55.2 | 32.2 | 32.2 | 32.2 |
| 1000-1200° F. Content, wt % | 20.6 | 12.8 | 12.8 | 12.8 |
| 1200+° F. Content, wt % | 34.6 | 19.4 | 19.4 | 19.4 |

TABLE 28

BHOS Runs Product Properties

| SCO Property | Baseline | 6 | 7 | 8 |
|---|---|---|---|---|
| API Gravity | 12.9 | 15.5 | 16.9 | 14.5 |
| Viscosity @ 40° C., cSt | 201 | 62.8 | 63.6 | 143 |
| Viscosity @ 100° C., cSt | nr | 9.11 | 6.45 | 12.7 |
| C7 Asphaltenes, wt % | nr | 4.10 | 1.27 | 3.94 |
| Vanadium Content, ppm | 88.0 | 25.6 | 27.7 | 45.3 |
| Nickel Content, ppm | 24.0 | 22.1 | 26.1 | 40.4 |
| Boiling Ranges | | | | |
| <200° F. Content, wt % | 0.177 | 0.00 | 0.00 | 0.00 |
| 200-350° F. Content, wt % | 1.92 | 1.64 | 2.85 | 0.00 |
| 350-500° F. Content, wt % | 7.33 | 10.9 | 9.74 | 9.66 |
| 500-650° F. Content, wt % | 8.25 | 23.2 | 21.2 | 21.2 |
| 650+° F. Content, wt % | 82.3 | 64.3 | 66.2 | 69.1 |
| 650-800° F. Content, wt % | 25.7 | 34.2 | 42.6 | 35.7 |
| 850-1000° F. Content, wt % | 19.4 | 15.4 | 16.7 | 17.6 |
| 1000+° F. Content, wt % | 37.2 | 14.7 | 6.91 | 15.8 |
| 1000-1200° F. Content, wt % | 21.3 | 4.01 | 6.28 | 7.43 |
| 1200+° F. Content, wt % | 15.9 | 10.7 | 0.630 | 8.41 |

TABLE 29

BHOS Run Comparison

| Configuration | Run ID | API | Liquid Yield, wt % | Liquid Yield, vol % | 1000+ Removal, wt % | C7A Removal, wt % | Viscosity Reduction, % | V Removal, wt % | Ni Removal, wt % |
|---|---|---|---|---|---|---|---|---|---|
| Baseline | nr | 12.9 | 74.4 | nr | 49.9 | nr | 99.5 | 68.7 | 79.2 |
| 6 | B031B | 15.5 | 77.5 | 80.3 | 64.6 | nr | 94.6 | 69.0 | 66.7 |
| 7 | B011A | 16.9 | 82.5 | 84.9 | 82.3 | 63.0 | 94.5 | 64.3 | 58.2 |
| 8 | B031A | 14.5 | 81.1 | 83.6 | 60.2 | nr | 87.6 | 42.6 | 36.4 |

Table 30 compares the run properties of the BHOS run configurations. Table 31 compares the product properties of the BHOS run configurations.

TABLE 30

BHOS Whole Crude Basis Run Properties Comparison

| Run Property | Baseline | 6 | 7 | 8 |
|---|---|---|---|---|
| Liquid Volume Yield, vol % | nr | 80.3 | 84.9 | 83.6 |
| Liquid Weight Yield, wt % | 74.4 | 77.5 | 82.5 | 81.1 |

TABLE 31

BHOS Product Properties Comparison

| Synthetic Crude Oil Property | Baseline | 6 | 7 | 8 |
|---|---|---|---|---|
| API Gravity | 12.9 | 15.5 | 16.9 | 14.5 |
| Viscosity Reduction, % | 99.5 | 94.6 | 94.5 | 87.6 |
| C7 Asphaltenes Removal, wt % | nr | nr | 63.0 | nr |
| Vanadium Removal, wt % | 68.7 | 69.0 | 64.3 | 42.6 |
| Nickel Removal, wt % | 79.2 | 66.7 | 58.2 | 36.4 |
| 1000° F.+ Material Removal, wt % | 49.9 | 64.6 | 82.3 | 60.2 |

Based on run properties of each configuration shown in Table 30, configuration 7 demonstrates the greatest success in liquid retention. The yield figures suggest that configuration 7 have better liquid yield than configurations 6 and 8. Therefore, based on run properties, configuration 8 is the more preferred configuration, followed by configuration 7.

Based on product properties of each configuration shown in Table 31, configuration 7 demonstrates superior product properties in areas of API and asphaltenes removal. Configuration 6, in the other hand, is superior in viscosity reduction, metal removal, and removal of heavy fraction.

Combining the assessment of both run and product properties, only configuration 7 demonstrates good performance in both areas. Therefore, configuration 7 (Nozzle 700+Distributor 800 combination) is the most preferred configuration, for BHOS Runs.

Table 32 lists and numbers the feed nozzle and distributor plate combinations used in Exploratory Heavy Oil Sample (EHOS) Runs. A representative run was assigned for each configuration, based on the nominal API gravity and liquid weight yield of a particular configuration.

TABLE 32

EHOS Runs Nozzle-Distributor Combinations

| Configuration | Representative Run | Feed Nozzle | Distributor Plate |
|---|---|---|---|
| 9 | E045.B | Nozzle 700 | Distributor 700 |
| 10 | E044.A | Nozzle 700 | Distributor 1100 |
| 11 | E043.B | Nozzle 2000 | Distributor 1100 |

Table 33 shows the properties of whole crude used in the baseline as well as the different EHOS run configurations. Table 34 shows the properties of product (SCO or synthetic crude oil) used in the different EHOS run configurations. Table 35 summarizes the properties from different EHOS run configurations.

TABLE 33

EHOS Runs Whole Crude Properties

| Whole Crude Property | Baseline | 9 | 10 | 11 |
|---|---|---|---|---|
| API Gravity | 8.6 | 7.7 | 8.4 | 8.4 |
| Viscosity @ 40° C., cSt | 40000 | nr | nr | nr |
| Viscosity @ 100° C., cSt | nr | 657 | 591 | 587 |
| C7 Asphaltenes, wt % | nr | 13.8 | 14.3 | 13.6 |
| Vanadium Content, ppm | 209 | 458 | 452 | 473 |
| Nickel Content, ppm | 86.0 | 151 | 141 | 147 |
| Boiling Ranges | | | | |
| <200° F. Content, wt % | 0.00 | 0.00 | 0.00 | 0.00 |
| 200-350° F. Content, wt % | 0.0396 | 0.00 | 0.00 | 0.00 |
| 350-500° F. Content, wt % | 3.60 | 1.88 | 2.00 | 2.44 |
| 500-650° F. Content, wt % | 5.09 | 9.22 | 9.23 | 8.88 |
| 650+° F. Content, wt % | 91.3 | 88.9 | 88.8 | 88.7 |
| 650-800° F. Content, wt % | 20.4 | 17.6 | 17.3 | 15.5 |
| 850-1000° F. Content, wt % | 15.7 | 13.6 | 13.3 | 12.4 |
| 1000+° F. Content, wt % | 55.2 | 57.7 | 58.2 | 60.8 |
| 1000-1200° F. Content, wt % | 20.6 | 18.3 | 18.1 | 17.9 |
| 1200+° F. Content, wt % | 34.6 | 39.4 | 40.0 | 42.9 |

TABLE 34

EHOS Runs Product Properties

| Synthetic Crude Oil Property | Baseline | 9 | 10 | 11 |
|---|---|---|---|---|
| API Gravity | 12.9 | 14.8 | 16.4 | 16.1 |
| Viscosity @ 40° C., cSt | 201 | 33.5 | 39.6 | 36.0 |
| Viscosity @ 100° C., cSt | nr | 6.80 | 5.25 | 6.45 |
| C7 Asphaltenes, wt % | nr | 5.23 | 4.12 | 4.19 |
| Vanadium Content, ppm | 88.0 | 79.2 | 119 | 121 |
| Nickel Content, ppm | 24.0 | 25.1 | 38.1 | 37.7 |
| Boiling Ranges | | | | |
| <200° F. Content, wt % | 0.177 | 0.00 | 0.00 | 0.00 |
| 200-350° F. Content, wt % | 1.92 | 4.18 | 3.06 | 3.83 |
| 350-500° F. Content, wt % | 7.33 | 12.9 | 12.8 | 11.5 |
| 500-650° F. Content, wt % | 8.25 | 23.7 | 19.5 | 16.9 |
| 650+° F. Content, wt % | 82.3 | 59.2 | 64.6 | 67.8 |
| 650-800° F. Content, wt % | 25.7 | 36.6 | 35.0 | 31.2 |
| 850-1000° F. Content, wt % | 19.4 | 15.0 | 13.5 | 15.5 |
| 1000+° F. Content, wt % | 37.2 | 7.62 | 16.1 | 21.1 |
| 1000-1200° F. Content, wt % | 21.3 | 4.11 | 6.12 | 7.98 |
| 1200+° F. Content, wt % | 15.9 | 3.51 | 10.0 | 13.1 |

TABLE 35

EHOS Run Comparison

| Configuration | Run ID | API | Liquid Yield, wt % | Liquid Yield, vol % | 1000+ Removal, wt % | C7A Removal, wt % | Viscosity Reduction, % | V Removal, wt % | Ni Removal, wt % |
|---|---|---|---|---|---|---|---|---|---|
| Baseline | nr | 12.9 | 74.4 | nr | 49.9 | nr | 99.5 | 68.7 | 79.2 |
| 9 | E045B | 14.8 | 62.7 | 67.5 | 91.7 | 76.2 | 99.0 | 89.2 | 89.6 |
| 10 | E044A | 16.4 | 90.1 | 96.1 | 75.1 | 74.0 | 99.1 | 76.3 | 75.7 |
| 11 | E043B | 16.1 | 78.3 | 83.6 | 72.8 | 75.9 | 98.9 | 80.0 | 79.9 |

Table 36 compares the run properties of the EHOS run configurations. Table 37 compares the product properties of the EHOS run configurations.

TABLE 36

EHOS Whole Crude Basis Run Properties Comparison

| Run Property | Baseline | 9 | 10 | 11 |
|---|---|---|---|---|
| Liquid Volume Yield, vol % | nr | 67.5 | 96.1 | 83.6 |
| Liquid Weight Yield, wt % | 74.4 | 62.7 | 90.1 | 78.3 |

TABLE 37

EHOS Product Properties Comparison

| Synthetic Crude Oil Property | Baseline | 9 | 10 | 11 |
|---|---|---|---|---|
| API Gravity | 12.9 | 14.8 | 16.4 | 16.1 |
| Viscosity Reduction, % | 99.5 | nr | nr | nr |
| C7 Asphaltenes Removal, wt % | nr | 76.2 | 74.0 | 75.9 |
| Vanadium Removal, wt % | 68.7 | 89.2 | 76.3 | 80.0 |
| Nickel Removal, wt % | 79.2 | 89.6 | 75.7 | 79.9 |
| 1000° F.+ Material Removal, wt % | 49.9 | 91.7 | 75.1 | 72.8 |

Based on run properties of each configuration shown in Table 36, configuration 10 demonstrates the greatest success in liquid retention. The yield figures suggest that configuration 10 has much better liquid yield than configurations 9 and 11. Therefore, configuration 10 is the more preferred configuration.

Based on product properties of each configuration shown in Table 37, configurations 9 and 10 both demonstrate superior product properties across the board. While configuration 9 has the best viscosity reduction, heavy material removal, and metal removal, configuration 10 has the best API and asphaltenes removal. For the areas where configuration 10 is not the best, it is still comparably close to the other 2 configurations.

Combining the assessment of both run and product properties, only configuration 10 demonstrates good performance in both areas. Therefore, configuration 10 (Nozzle 700+Distributor 1100 combination) is the most preferred configuration, for EHOS runs.

Table 38 lists and numbers the feed nozzle and distributor plate combinations used in Unidentified Heavy Oil Sample (UHOS) runs. A representative run was assigned for each configuration, based on the nominal API gravity and liquid weight yield of a particular configuration.

TABLE 38

UHOS Nozzle-Distributor Combinations

| Configuration # | Representative Run | Feed Nozzle | Distributor Plate |
|---|---|---|---|
| 13 | U038.A | Nozzle 700 | Distributor 1100 |
| 14 | U037.B | Nozzle 700 | Distributor 1200 |
| 15 | U037.A | Nozzle 2000 | Distributor 400 |

Table 39 shows the properties of whole crude used in the baseline as well as the different UHOS run configurations. Table 40 shows the properties of product (SCO or synthetic crude oil) used the different UHOS run configurations. Table 41 summarizes the properties from different UHOS run configurations.

TABLE 39

UHOS Runs Whole Crude Properties

| Whole Crude Property | Baseline | 13 | 14 | 15 |
|---|---|---|---|---|
| API Gravity | 8.6 | 11.3 | 10.8 | 10.8 |
| Viscosity @ 40° C., cSt | 40000 | 5717 | 4725 | 4725 |
| Viscosity @ 100° C., cSt | nr | 143 | 147 | 147 |
| C7 Asphaltenes, wt % | nr | 16.9 | 17.3 | 17.3 |
| Vanadium Content, ppm | 209 | 435 | 450 | 450 |
| Nickel Content, ppm | 86.0 | 81.1 | 83.3 | 83.3 |
| Boiling Ranges | | | | |
| <200° F. Content, wt % | 0.00 | 0.237 | 0.302 | 0.302 |
| 200-350° F. Content, wt % | 0.0396 | 4.27 | 3.39 | 3.39 |
| 350-500° F. Content, wt % | 3.60 | 6.19 | 5.70 | 5.70 |
| 500-650° F. Content, wt % | 5.09 | 8.40 | 9.29 | 9.29 |
| 650+° F. Content, wt % | 91.3 | 80.9 | 81.3 | 81.3 |
| 650-800° F. Content, wt % | 20.4 | 13.0 | 13.4 | 13.4 |
| 850-1000° F. Content, wt % | 15.7 | 10.2 | 13.7 | 13.7 |
| 1000+° F. Content, wt % | 55.2 | 57.7 | 54.2 | 54.2 |
| 1000-1200° F. Content, wt % | 20.6 | 17.4 | 17.7 | 17.7 |
| 1200+° F. Content, wt % | 34.6 | 40.3 | 36.5 | 36.5 |

TABLE 40

UHOS Runs Product Properties

| SCO Property | Baseline | 13 | 14 | 15 |
|---|---|---|---|---|
| API Gravity | 12.9 | 13.7 | 19.2 | 16.7 |
| Viscosity @ 40° C., cSt | 201 | 118 | 24.6 | 68.4 |
| Viscosity @ 100° C., cSt | nr | 20.7 | 4.59 | 7.27 |
| C7 Asphaltenes, wt % | nr | 8.84 | 2.52 | 6.87 |
| Vanadium Content, ppm | 88.0 | 197 | 72.2 | 170 |
| Nickel Content, ppm | 24.0 | 33.0 | 10.2 | 29.6 |
| Boiling Ranges | | | | |
| <200° F. Content, wt % | 0.177 | 0.00 | 0.00 | 0.00 |
| 200-350° F. Content, wt % | 1.92 | 4.52 | 6.41 | 5.16 |
| 350-500° F. Content, wt % | 7.33 | 9.64 | 12.6 | 10.4 |
| 500-650° F. Content, wt % | 8.25 | 15.4 | 20.7 | 17.4 |
| 650+° F. Content, wt % | 82.3 | 70.4 | 60.3 | 67.0 |
| 650-800° F. Content, wt % | 25.7 | 23.9 | 29.5 | 25.1 |
| 850-1000° F. Content, wt % | 19.4 | 15.1 | 16.7 | 15.7 |
| 1000+° F. Content, wt % | 37.2 | 31.4 | 14.1 | 26.2 |
| 1000-1200° F. Content, wt % | 21.3 | 11.6 | 5.16 | 9.70 |
| 1200+° F. Content, wt % | 15.9 | 19.8 | 8.93 | 16.5 |

TABLE 41

UHOS Run Comparison

| Configuration | Run ID | API | Liquid Yield, wt % | Liquid Yield, vol % | 1000+ Removal, wt % | C7A Removal, wt % | Viscosity Reduction, % | V Removal, wt % | Ni Removal, wt % |
|---|---|---|---|---|---|---|---|---|---|
| Baseline | nr | 12.9 | 74.4 | nr | 49.9 | nr | 99.5 | 68.7 | 79.2 |
| 13 | U038A | 13.7 | 73.6 | 75.7 | 59.9 | 61.5 | 97.9 | 66.7 | 70.1 |
| 14 | U037B | 19.2 | 66.8 | 70.4 | 82.6 | 90.3 | 99.5 | 89.3 | 91.8 |
| 15 | U037A | 16.7 | 82.0 | 84.6 | 60.4 | 67.4 | 98.6 | 69.0 | 70.1 |

Table 42 compares the whole crude basis run properties of UHOS run configurations. Table 43 compares the product properties of the UHOS run configurations.

TABLE 42

UHOS Whole Crude Basis Run Properties Comparison

| Run Property | Baseline | 13 | 14 | 15 |
|---|---|---|---|---|
| Liquid Volume Yield, vol % | nr | 75.7 | 70.4 | 84.6 |
| Liquid Weight Yield, wt % | 74.4 | 73.6 | 66.8 | 82.0 |

TABLE 43

UHOS Run Product Properties Comparison

| SCO Property | Baseline | 13 | 14 | 15 |
|---|---|---|---|---|
| API Gravity | 12.9 | 13.7 | 19.2 | 16.7 |
| Viscosity Reduction, % | 99.5 | 97.9 | 99.5 | 98.6 |
| C7 Asphaltenes Removal, wt % | nr | 61.5 | 90.3 | 67.4 |
| Vanadium Removal, wt % | 68.7 | 66.7 | 89.3 | 69.0 |
| Nickel Removal, wt % | 79.2 | 70.1 | 91.8 | 70.9 |
| 1000° F.+ Material Removal, wt % | 49.9 | 59.9 | 82.6 | 60.4 |

Based on run properties of each configuration shown in Table 42, configuration 15 demonstrates greater success in liquid retention. Therefore, configuration 15 is more preferred.

Based on product properties of each configuration shown in Table 43, configuration 14 demonstrates superior product properties across the board, followed by configuration 15.

Combining the assessment of liquid yield and product properties, configuration 15 is vastly preferred due to the higher liquid volume yield. Therefore, configuration 15 (Nozzle 2000+Distributor 400 combination) is the most preferred configuration, for UHOS runs. It is likely that the deficiencies of Distributor 400, shown less effective in every other comparison, were less influential that the advantages provided by Nozzle 2000. That is, the performance of the combination of advantageous distributor and Nozzle 2000 would be expected to exceed configuration 15 on this particular crude.

In the description above, for purposes of explanation only, specific nomenclature is set forth to provide a thorough understanding of the present disclosure. However, it will be apparent to one skilled in the art that these specific details are not required to practice the teachings of the present disclosure.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A method, system, and apparatus for lift gas distribution have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

What is claimed is:

1. A lift gas distributor, comprising:
    a plate having a top reactor-facing surface and an underside, the plate having a first diameter;
    a center section of the plate having a second diameter, wherein the first diameter is at least twice as large as the second diameter;
    a predetermined number of holes having a third diameter drilled into the surface of the plate, the holes drilled at an angle, the holes evenly distributed in the center section; and
    a plurality of tubes welded onto the underside of the plate, each tube having a predetermined length, wherein each tube is welded onto each hole and is disposed below the top surface of the plate,
    wherein all holes are within the center section of the plate.

2. The lift gas distributor of claim 1, wherein the predetermined number of holes is 16.

3. The lift gas distributor of claim 1, wherein the predetermined number of holes is 11.

4. The lift gas distributor of claim 1, wherein the holes are arranged in a 5-star pointed pattern.

5. The lift gas distributor of claim 1, wherein the third diameter is ¼ inches.

6. The lift gas distributor of claim 1, wherein the plate has a thickness of ¼ inches.

7. The lift gas distributor of claim 1, wherein the predetermined length of each tube is 4 inches.

8. The lift gas distributor of claim 1, wherein each tube has a proximal end and a distal end, and wherein a diameter of the tube gradually increases from the proximal end to the distal end.

9. The lift gas distributor of claim 1, wherein the angle is one of 90°, 45°, and 66°.

10. The lift gas distributor of claim 1, wherein the holes are drilled at a plurality of angles, each angle selected from the group consisting of 90°, 45°, and 66°.

11. A method for lift gas distribution, comprising:
    providing a lift gas distributor, the lift gas distributor comprising
    a plate having a top surface facing a reactor and an underside, the plate having a first diameter;
    a center section of the plate having a second diameter, wherein the first diameter is at least twice as large as the second diameter;
    a predetermined number of holes having a third diameter drilled into the surface of the plate, the holes drilled at an angle, the holes evenly distributed in the center section, and wherein all holes are within the center section of the plate; and
    a plurality of tubes welded onto the underside of the plate, each tube having a predetermined length, wherein each tube is welded onto each hole and is disposed below the top surface of the plate; and
    propelling lift gas from a windbox through the lift gas distributor into the reactor.

12. The method of claim 11, wherein the predetermined number of holes is 16.

13. The method of claim 11, wherein the predetermined number of holes is 11.

14. The method of claim 11, wherein the holes are arranged in a 5-star pointed pattern.

15. The method of claim 11, wherein the third diameter is ¼ inches.

16. The method of claim 11, wherein the plate has a thickness of ¼ inches.

17. The method of claim 11, wherein the predetermined length of each tube is 4 inches.

18. The method of claim 11, wherein each tube has a proximal end and a distal end, and wherein a diameter of the tube gradually increases from the proximal end to the distal end.

19. The method of claim 11, wherein the angle is one of 90°, 45°, and 66°.

20. The method of claim 11, wherein the holes are drilled at a plurality of angles, each angle selected from the group consisting of 90°, 45°, and 66°.

* * * * *